United States Patent
Liang et al.

(10) Patent No.: US 10,554,536 B2
(45) Date of Patent: Feb. 4, 2020

(54) METHOD FOR OBTAINING PATH INFORMATION AND APPARATUS

(71) Applicant: Huawei Technologies Co., Ltd., Shenzhen, Guangdong (CN)

(72) Inventors: Qiandeng Liang, Nanjing (CN); Xiaohu Xu, Beijing (CN); Qin Wu, Nanjing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/866,305

(22) Filed: Jan. 9, 2018

(65) Prior Publication Data

US 2018/0159759 A1 Jun. 7, 2018
US 2018/0367438 A9 Dec. 20, 2018

Related U.S. Application Data

(63) Continuation of application No. PCT/CN2015/095855, filed on Nov. 27, 2015.

(51) Int. Cl.
*H04L 12/751* (2013.01)
*H04L 12/703* (2013.01)
(Continued)

(52) U.S. Cl.
CPC ............ *H04L 45/02* (2013.01); *H04L 43/50* (2013.01); *H04L 45/24* (2013.01); *H04L 45/28* (2013.01);
(Continued)

(58) Field of Classification Search
CPC ....... H04L 45/02; H04L 45/306; H04L 45/24; H04L 45/745; H04L 45/28; H04L 43/50; H04L 45/50; H04L 43/0811; H04L 43/10
See application file for complete search history.

(56) References Cited

U.S. PATENT DOCUMENTS 7,995,483 B1 * 8/2011 Bayar ............... H04L 41/0893
  370/241.1
2011/0299406 A1 12/2011 Vobbilisetty et al.
(Continued)

FOREIGN PATENT DOCUMENTS

CN 101227248 A 7/2008
CN 102271079 A 12/2011
(Continued)

OTHER PUBLICATIONS

Eastlake, III, "IANA Considerations for Connectivity Fault Management (CFM) Code Points", Internet Engineering Task Force (IETF), Request for Comments: 7319, Category: Best Current Practice, ISSN: 2070-1721, Jul. 2014, 5 pages.
(Continued)

*Primary Examiner* — Jae Y Lee
(74) *Attorney, Agent, or Firm* — Womble Bond Dickinson (US) LLP

(57) ABSTRACT

Embodiments of this application provide a method for obtaining path information and an apparatus, relate to the communications field, and can accurately obtain a forwarding path for detecting a service packet. A service packet is obtained, where the service packet is a target service packet or an updated target service packet, the target service packet is a service packet that matches a flow rule, and the flow rules used to obtain the service packet that matches the flow rule; an ingress interface information field and/or an egress interface information field is/are generated according to a path detection tag on an ingress interface and/or an egress interface through which the service packet passes. The method is used to obtain path information of the service packet.

17 Claims, 13 Drawing Sheets

Obtain a service packet 101

Generate an ingress interface information field or/and an egress interface information field according to a path detection tag on an ingress interface or/and an egress interface through which the service packet passes 102

(51) Int. Cl.
*H04L 12/741* (2013.01)
*H04L 12/26* (2006.01)
*H04L 12/723* (2013.01)
*H04L 12/725* (2013.01)
*H04L 12/707* (2013.01)

(52) U.S. Cl.
CPC ............ *H04L 45/306* (2013.01); *H04L 45/50* (2013.01); *H04L 45/745* (2013.01); *H04L 43/0811* (2013.01); *H04L 43/10* (2013.01)

(56) References Cited

U.S. PATENT DOCUMENTS

| | | | |
|---|---|---|---|
| 2013/0242759 A1* | 9/2013 | Durrani | H04L 43/50 370/248 |
| 2014/0133289 A1* | 5/2014 | Jadav | H04L 43/0811 370/216 |
| 2014/0241345 A1 | 8/2014 | DeCusatis et al. | |
| 2015/0003231 A1 | 1/2015 | Chen | |
| 2015/0092564 A1 | 4/2015 | Aldrin | |

FOREIGN PATENT DOCUMENTS

| | | |
|---|---|---|
| CN | 102769552 A | 11/2012 |
| CN | 105099915 A | 11/2015 |

OTHER PUBLICATIONS

Senevirathne et al., "NVO3 Fault Management draft-tissa-nvo3-oam-fm-01.txt", NV03 Working Group, Internet Draft, Intended Status: Standard Track, Jan. 27, 2015, 35 pages.
Senevirathne, et al: "TRILL Fault Management draft-ietf-trill-oam-fm-11.txt", TRILL Working group, Internet Draft Intended status: Standard Track, Oct. 24, 2014, 65 pages.
Jain et al., "Detecting VXLAN Segment Failure draft-jain-nvo3-vxlan-ping-00", NVO3 Internet-Draft Intended status: Standards Track, Jun. 6, 2013, 20 pages.
"IEEE Standard for Local and metropolitan area networks—Station and Media Access Control Connectivity Discovery", IEEE Computer Society, LAN/MAN Standards Committee, IEEE Std 802.1AB™-2009, Sep. 17, 2009, 204 pages.
"IEEE Standard for Local and metropolitan area networks—Virtual Bridged Local Area Networks Amendment 5: Connectivity Fault Management", IEEE Computer Society, LAN/MAN Standards Committee, IEEE Std 802.1ag™-2007, Dec. 17, 2007, 260 pages.

* cited by examiner

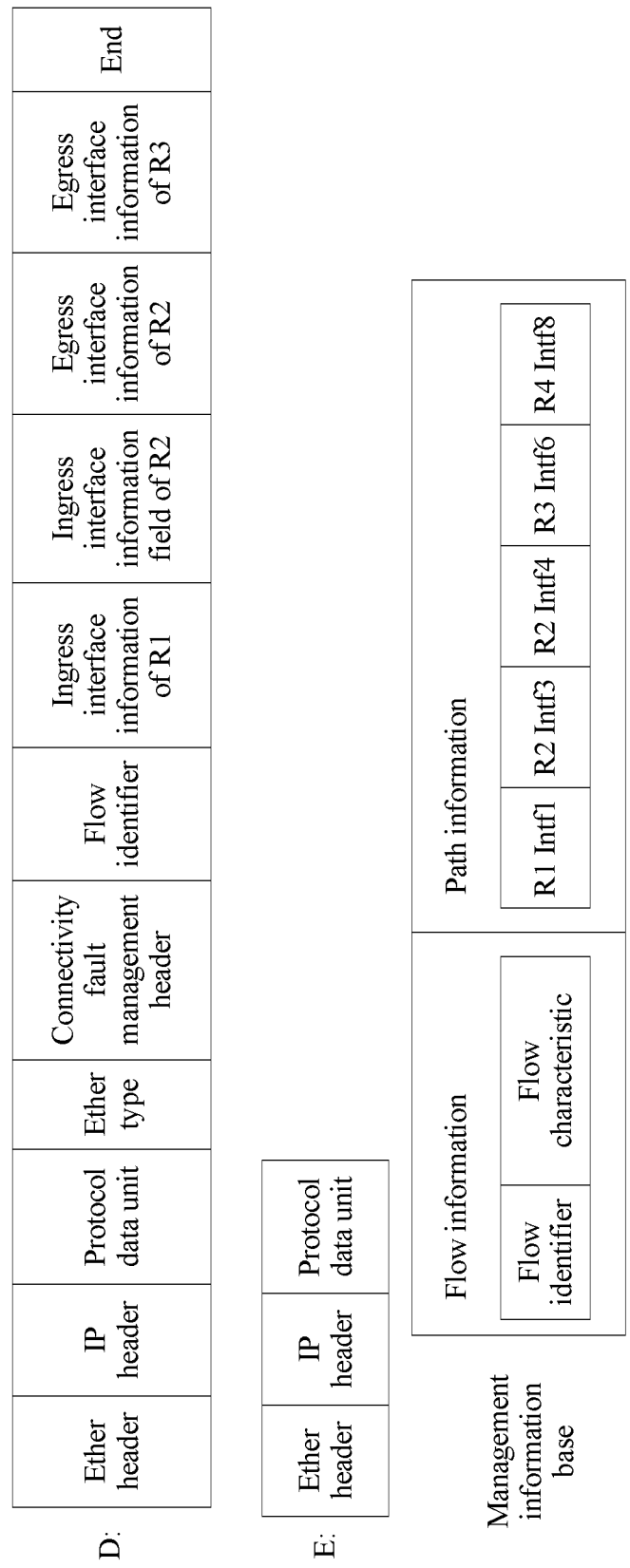

```
+-+-+-+-+-+-+-+-+-+-+-+-+-+-+-+-+-+-+-+
| Type (TBD, Forwarding Port TLV) |  1 Byte
+-+-+-+-+-+-+-+-+-+-+-+-+-+-+-+-+-+-+-+
| Length                          |  2 Bytes
+-+-+-+-+-+-+-+-+-+-+-+-+-+-+-+-+-+-+-+
| Flags                           |  1 Byte
+-+-+-+-+-+-+-+-+-+-+-+-+-+-+-+-+-+-+-+
| Node ID Type                    |  1 Byte
+-+-+-+-+-+-+-+-+-+-+-+-+-+-+-+-+-+-+-+
| Node ID Length                  |  1 Byte
+-+-+-+-+-+-+-+-+-+-+-+-+-+-+-+-+-+-+-+
| Node ID                         |  Variable,=< 255 Bytes
+-+-+-+-+-+-+-+-+-+-+-+-+-+-+-+-+-+-+-+
| Forwarding Port Desc Length     |  1 Byte
+-+-+-+-+-+-+-+-+-+-+-+-+-+-+-+-+-+-+-+
| Forwarding Port Description     |  Variable,=< 255 Bytes
+-+-+-+-+-+-+-+-+-+-+-+-+-+-+-+-+-+-+-+
| Physical Port Desc Length       |  1 Byte, Optional
+-+-+-+-+-+-+-+-+-+-+-+-+-+-+-+-+-+-+-+
| Physical Port Description       |  Variable,=< 255 Bytes, Optional
+-+-+-+-+-+-+-+-+-+-+-+-+-+-+-+-+-+-+-+
```

FIG. 15

```
0 1 2 3 4 5 6 7
+-+-+-+-+-+-+-+-+
|I|V| Reserved  |
+-+-+-+-+-+-+-+-+
```

FIG. 16

```
+-+-+-+-+-+-+-+-+-+-+-+-+-+-+-+-+-+-+-+-+
| Type (TBD, PMTU TLV)      | 1 Byte
+-+-+-+-+-+-+-+-+-+-+-+-+-+-+-+-+-+-+-+-+
| Length             | 2 Bytes
+-+-+-+-+-+-+-+-+-+-+-+-+-+-+-+-+-+-+-+-+
| PMTU               | 2 Byte
+-+-+-+-+-+-+-+-+-+-+-+-+-+-+-+-+-+-+-+-+
```

FIG. 17

METHOD FOR OBTAINING PATH INFORMATION AND APPARATUS

CROSS-REFERENCE TO RELATED APPLICATIONS

This application is a continuation of International Application. No. PCT/CN2015/095855, filed on Nov. 27, 2015, the disclosure of which is hereby incorporated by reference in its entirety.

TECHNICAL FIELD

This application relates to the communications field, and in particular, to a method for obtaining path information and an apparatus.

BACKGROUND

Equal-cost multi-path (ECMP) means that there are multiple different routing paths having equal cost for arriving at a same destination Internet. Protocol (IP) address or a destination network segment. In an ECMP network environment, operation and maintenance personnel may perform path trace and fault locating and diagnosis for a service packet by using an operation administration and maintenance (OAM) detection technology.

In the prior art, a sampling point may be deployed in a network to collect a target service packet. The sampling point uses a protocol such as NetFlow or SFlow to process a sampling packet, and then sends a processed sampling packet to a centralized sampling data analysis center. The sampling data analysis center analyzes a link through which the sampling packet passes in the network within a same time period, so as to obtain, according to the sampling packet, a forwarding path through which the target service packet passes in the network. However, excessive network resources need to be consumed to obtain the sampling packet, and perform analysis and processing by the sampling data analysis center, and detection efficiency and accuracy are relatively low.

Optionally, path trace and fault locating and diagnosis for the service packet may be performed by using a RouteTrace mechanism based on an Internet Control Message Protocol (ICMP), or Ether CAM LinkTrace mechanism based on connectivity fault management (CFM), or a Label Switching Path (LSP) TraceRT mechanism based on Multiprotocol Label Switching (MPLS) CAM, or the like. A specific step for performing path trace and fault locating and diagnosis for the service packet according to the foregoing CAM protocol mechanism includes: A path detection initiation device includes a time to live (Time To Live, TTL) field in a path detection packet, where an initial TTL is 1, and after the path detection initiation device receives a response from another forwarding device, TTL is gradually increased by 1. Because the service packet includes not only a destination IP address or a Media Access Control (MAC) address, in the ECMP network environment, a hash value of a quintet of a path detection packet obtained according to a hash algorithm may be used as a routing key value. The routing key value is used to determine a forwarding path of the path detection packet. Different bash algorithms may be configured in various forwarding devices, the forwarding path of the path detection packet and a forwarding path of the service packet may be different, and therefore, a forwarding path of the target service packet may not be accurately detected.

Therefore, how to accurately obtain a forwarding path of a service packet becomes an urgent problem to be resolved.

SUMMARY

Embodiments of this application provide a method for obtaining path information and an apparatus, so as to accurately obtain a forwarding path for detecting service packet.

To achieve the foregoing objective, the following technical solutions are used in the embodiments of this application.

According to a first aspect of this application, a method for obtaining path information is provided, and is applied to a forwarding device. The method includes:

obtaining a service packet, where the service packet is a target service packet or an updated target service packet, the target service packet is a service packet that matches a flow rule, and the flow rule preconfigured on the forwarding device; and generating ingress interface information and/or egress interface information according to a path detection tag on an ingress interface and/or an egress interface through which the service packet passes.

Optionally, the flow rule is characteristic matching information of a specific service packet.

Optionally, the target service packet includes connectivity fault management information, and the connectivity fault management information includes an Ether type field, a connectivity fault management header field, a first ingress interface information field and/or a first egress interface information field, and an end field.

Optionally, the connectivity fault management information is located at a tail of an Ethernet packet of the service packet.

After the obtaining a service packet, the method further includes:

generating a dummy packet of the target service packet according to a detection policy, where the dummy packet includes the connectivity fault management information.

Optionally the generating a dummy packet of the target service packet according to a detection policy includes:

directly generating the dummy packet of the target service packet according to an instruction of the detection policy; or determining whether a length of the target service packet is greater than a preset threshold; if the length of the target service packet is greater than the preset threshold, generating the dummy packet of the target service packet according to the target service packet, and generating, the first ingress interface information and/or the first egress interface information and the connectivity fault management information according to the path detection tag on the ingress interface and/or the egress interface through which the dummy packet of the target service packet passes; or if the length of the target service packet is less than the preset threshold, generating a first ingress interface information field and/or a first egress interface information field and the connectivity fault management information according to the path detection tag on the ingress interface and/or the egress interface through which the target service packet passes, where the dummy packet further includes a header that has a preset quantity of bytes and that is of the target service packet, and a packet mark used to identify the dummy packet is set at a preset location of the dummy packet.

Optionally, when the forwarding device is an intermediate device, the target service packet includes the path detection tag on the ingress interface and/or the egress interface through which the target service packet passes, and the generating an ingress interface information and/or an egress interface information according to a path detection tag on an ingress interface and/or an egress interface through which the service packet passes includes:

generating a second ingress interface information field and/or a second egress interface information field according to a path detection tag on an ingress interface and/or an egress interface through which the updated target service packet passes, to obtain another updated target service packet, where the another updated target service packet includes connectivity fault management information, the connectivity fault management information includes an Ether type field, a connectivity fault management header field, a first ingress interface information field and/or a first egress interface information field, the second ingress interface in field and/or the second egress interface information field, and an end field, and the connectivity fault management information is located at a tail of an Ethernet packet of the another updated target service packet; and forwarding the another updated target service packet.

Optionally, when the forwarding device is an egress device, after the obtaining a service packet, the method further includes:

parsing and extracting the service packet according to a path detection untag on the ingress interface and/or the egress interface through which the service packet passes, to obtain connectivity fault management information and a packet characteristic field, where the connectivity fault management information includes an Ether type field, a connectivity fault management header field, one or more ingress interface information fields and/or one or more egress interface information fields, and an end field, the one or more ingress interface information fields and/or the one or more egress interface information fields form path information, the path information is used to indicate a forwarding path of the service packet in a forwarding path detection enabling network, and the service packet includes the connectivity fault management information and the packet characteristic field.

Optionally, after the parsing and extracting the service packet according to a path detection untag on the ingress interface and/or the egress interface through which the service packet passes, to obtain connectivity fault management information and packet characteristic field, the method further includes:

when the service packet is a dummy packet, discarding the service packet;

when the service packet is a normal packet, stripping the connectivity fault management information, and continuing to forward the service packet; and generating and saving a forwarding path information table of the flow rule according to the packet characteristic field and the path information, so that the forwarding path information table is queried by a network management device or is sent to a network controller.

Optionally, before the obtaining a service packet, the method further includes:

preconfiguring at least one of the path detection tag, the path detection untag, or the flow rule, where the path detection tag is used to instruct the forwarding device to configure the ingress interface information or the egress interface information of the forwarding device, and the path detection untag is used to instruct the forwarding device to parse and extract connectivity fault management information and a packet characteristic field of an updated target service packet.

According to a second aspect, a forwarding device is provided, including:

an obtaining unit, configured to obtain a service packet, where the service packet is a target service packet or an updated target service packet, the target service packet is a service packet that matches a flow rule, and the flow rule is used to obtain the service packet that matches the flow rule; and a generation unit, configured to generate an ingress interface information field and/or an egress interface information field according to a path detection tag on an ingress interface and/or an egress interface through which the service packet passes.

Optionally, when the forwarding device is an ingress device, the service packet is the target service packet, and the forwarding device further includes:

a determining unit, configured to determine that a packet characteristic field of the service packet matches the flow rule, and determine that the service packet is the target service packet, where the service packet includes the packet characteristic field.

Optionally, the generation unit is specifically configured to:

generate a first ingress interface information field and/or a first egress interface information field and connectivity fault management information according to the path detection tag on the ingress interface and/or the egress interface through which the target service packet passes, where the target service packet includes the connectivity fault management information, the connectivity fault management information includes an Ether type field, a connectivity fault management header field, the first ingress interface information field and/or the first egress interface information field, and an end field, and the connectivity fault management information is located at a tail of an Ethernet packet of the service packet, where the forwarding device further includes:

a first sending unit, configured to forward the target service packet.

Optional the generation unit is further configured to:

generate a dummy packet of the target service packet according to a detection policy, where the dummy packet includes the connectivity fault management information.

Optionally, the generation unit is specifically configured to:

directly generate the dummy packet of the target service packet according to an instruction of the detection policy; or determine ether a length of the target service packet is greater than a preset threshold;

if the length of the target service packet is greater than the preset threshold, generate the dummy packet of the target service packet according to the target service packet, and generate the first ingress interface information field and/or the first egress interface information field and the connectivity fault management information according to the path detection tag on the ingress interface and/or the egress interface through which the dummy packet of the target service packet passes; or if the length of the target service packet is less than the preset threshold, generate the first ingress interface information field and/or the first egress interface information field and the connectivity fault management information according to the path detection tag on the ingress interface and/or the egress interface through which the target service packet passes, where the dummy packet further includes a header that has a preset quantity of bytes and that is of the target service packet, and a packet mark used to identify the dummy packet is set at a preset location of the dummy packet.

Optionally, when the forwarding device is an intermediate device, the service packet is the updated target service packet, and the generation unit is specifically configured to:

generate a second ingress interface information field and/or a second egress interface information field according to a path detection tag on an ingress interface and/or an egress interface through which the updated target service packet passes, to obtain another updated target service packet, where the another updated target service packet includes connectivity fault management information, the connectivity fault management information includes an Ether type field, a connectivity fault management header field, first ingress interface information field and/or a first egress interface information field, the second ingress interface information field and/or the second egress interface information field, and an end field, and the connectivity fault management information is located at a tail of an Ethernet packet of the service packet; and the forwarding device further includes:
second sending unit, configured to forward the another updated target service packet.

Optionally, when the forwarding device is an egress device, the forwarding device further includes:

a detachment unit, configured to parse and extract the service packet according to a path detection untag on the ingress interface and/or the egress interface through which the service packet passes, to obtain connectivity fault management information and a packet characteristic field, where the connectivity fault management information includes an Ether type field, a connectivity fault management header field, one or more ingress interface information fields and/or one or more egress interface information fields, and an end field, the one or more ingress interface information fields and/or the one or more egress interface information fields form path information, the path information is used to indicate a forwarding path of the service packet in a forwarding path detection enabling network, and the service packet includes the connectivity fault management information and the packet characteristic field.

Optionally, the forwarding device further includes:
a processing unit, configured to: when the service packet is a dummy packet, discard the service packet;
the forwarding device further includes:
third sending unit, configured to: when the service packet is a normal packet, strip the connectivity fault management information, and continue to forward the service packet; and
the processing unit is further configured to generate and save a forwarding path information table of the flow rule according to the packet characteristic field and the path information, so that the forwarding path information table is queried by a network management device or is sent to a network controller.

Optionally, the forwarding device further includes:
a configuration unit, configured to preconfigure at least one of the path detection tag, the path detection untag, or the flow rule, where the path detection tag is used to instruct the forwarding device to configure the ingress interface information or the egress interface information of the forwarding device, and the path detection untag is used to instruct the forwarding device to parse and extract connectivity fault management information and a packet characteristic field of an updated target service packet.

According to a third aspect, a forwarding device is provided, including:
a memory, configured to store program code; and
a processor, configured to invoke the program code stored in the memory to execute the following method:
obtaining a service packet, where the service packet is a target service packet or an updated target service packet, the target service packet is a service packet that matches a flow rule, and the flow rule is used to obtain the service packet that matches the flow rule, where
the processor is further configured to generate an ingress interface information field and/or an egress interface information field according to a path detection tag on an ingress interface and/or an egress interface through which the service packet passes; and
a bus, configured to connect the processor and the memory, and complete mutual communication.

Optionally, the processor is further configured to:
determine that a packet characteristic field of the service packet matches the flow rule, and determine that the service packet is the target service packet, where the service packet includes the packet characteristic field.

Optionally, the processor is specifically configured to:
generate a first ingress interface information field and/or a first egress interface information field and connectivity fault management information according to the path detection tag on the ingress interface and/or the egress interface through which the target service packet passes, where the target service packet includes the connectivity fault management information, the connectivity fault management information includes an Ether type field, connectivity fault management header field, the first ingress interface information field and/or the first egress interface information field, and an end field, and the connectivity fault management information is located at a tail of an Ethernet packet of the service packet, where the forwarding device further includes:
a first interface circuit, configured to forward the target service packet.

Optionally, the processor is further configured to:
generate a dummy packet of the target service packet according to a detection policy, where the dummy packet includes the connectivity fault management information.

Optionally, the processor is specifically configured to:
directly generate the dummy packet of the target service packet according to an instruction of the detection policy; or
determine whether a length of the target service packet is greater than a preset threshold;
if the length of the target service packet is greater than the preset threshold, generate the dummy packet of the target service packet according to the target service packet, and generate the first ingress interface information field and/or the first egress, interface information field and the connectivity fault management information according to the path detection tag on the ingress interface and/or the egress interface through which the dummy packet of the target service packet passes; or if the length of the target service packet is less than the preset threshold, generate the first ingress interface information field and/or the first egress interface information field and the connectivity fault management information according to the path detection tag on the ingress interface and/or the egress interface through which the target service packet passes, where the dummy packet further includes a header that has a preset quantity of bytes and that is of the target service packet, and a packet mark used to identify the dummy packet is set at a preset location of the dummy packet.

Optionally, when the forwarding device is an intermediate device, the service packet is the updated target service packet, and the processor is specifically configured to:

generate a second ingress interface information field and/or a second egress interface information field according to a path detection tag on an ingress interface and/or an egress interface through which the updated target service packet passes, to obtain another updated target service packet, where the another updated target service packet includes connectivity fault management information, the connectivity fault management information includes an Ether type field, a connectivity fault management header field, a first ingress interface information field and/or a first egress interface information field, the second ingress interface information field and/or the second egress interface information field, and an end field, and the connectivity fault management information is located at a tail of an Ethernet packet of the service packet; and the forwarding device further includes:

a second interface circuit, configured to forward the another updated target service packet.

Optionally, when the forwarding device is an egress device, the processor is specifically configured to:

parse and extract the service packet according to a path detection untag on the ingress interface and/or the egress interface through which the service packet passes, to obtain connectivity fault management information and a packet characteristic field, where the connectivity fault management information includes an Ether type field, a connectivity fault management header field, one or more ingress interface information fields and/or one or more egress interface information fields, and an end field, the one or more ingress interface information fields and/or the one or more egress interface information fields form path information, the path information is used to indicate a forwarding path of the service packet in a forwarding path detection enabling network, and the service packet includes the connectivity fault management information and the packet characteristic field.

Optionally, the processor is further configured to: when the service packet is a dummy packet, discard the service packet;

the forwarding device further includes:

a third interface circuit, configured to: when the service packet is a normal packet, strip the connectivity fault management information, and continue to forward the service packet; and the processor is further configured to:

generate and save a forwarding path information table of the flow rule according to the packet characteristic field and the path information, so that the forwarding path information table is queried by a network management device or is sent to a network controller.

Optionally, the processor is further configured to:

preconfigure at least one of the path detection tag, the path detection untag, or the flow rule, where the path detection tag is used to instruct the forwarding device to configure the ingress interface information or the egress interface information of the forwarding device, and the path detection untag is used to instruct the forwarding device to parse and extract connectivity fault management information and a packet characteristic field of an updated target service packet.

According to the method for obtaining path information and the apparatus, after the service packet is obtained, the ingress interface information field and/or the egress interface information field is/are generated according to path detection tag on the ingress interface and/or the egress interface through which the service packet passes. Compared with a method for consuming more network resources to analyze a sampling packet in the prior art, or a track mechanism of the OAM protocol for which a forwarding path cannot be accurately detected, in the method in the embodiments of this application, the path detection tag is configured in the forwarding device, the ingress interface information and/or the egress interface information of the forwarding device is/are directly configured in the service packet according to the instruction of the path detection tag to obtain the forwarding path of the service packet, so that the forwarding path of the service packet can be accurately obtained, and fewer network resources are consumed.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show some embodiments of this application, and a person of ordinary skill in the art may still derive other drawings from these accompanying drawings without creative efforts.

FIG. 4A and FIG. 4B are a schematic structural diagram of another service packet according to an embodiment of this application;

FIG. 15 is a schematic structural diagram of a coding format of Forwarding Port TLV according to an embodiment of this application.

FIG. 16 is a schematic structural diagram of flags of the coding format in FIG. 15 according to an embodiment of this application.

FIG. 17 is a schematic structural diagram of a coding format of PMTU TLV according to an embodiment of this application.

DESCRIPTION OF EMBODIMENTS

The following clearly describes the technical solutions in the embodiments of this application with reference to the accompanying drawings in the embodiments of this application. Apparently, the described, embodiments are merely some but not all of the embodiments of this application. All other embodiments obtained by a person of ordinary skill in the art based on the embodiments of this application without creative efforts shall fall within the protection scope of this application.

A method for obtaining path information described in this application is implemented based, on a forwarding path detection enabling network. The forwarding path detection enabling network includes multiple forwarding devices. The forwarding devices can support a device for implementing configuration and, modification. The forwarding devices are interconnected, and the forwarding devices may be switches or routers. The forwarding path detection enabling network may be a packet transport network (PIN), or a network using a Multiprotocol Label Switching (MPLS) technology, or an Internet Protocol (IP) network. This is not limited in this application herein, and, a network that can implement the method for obtaining path information described in this application may be a forwarding path detection enabling network.

Figure 1:
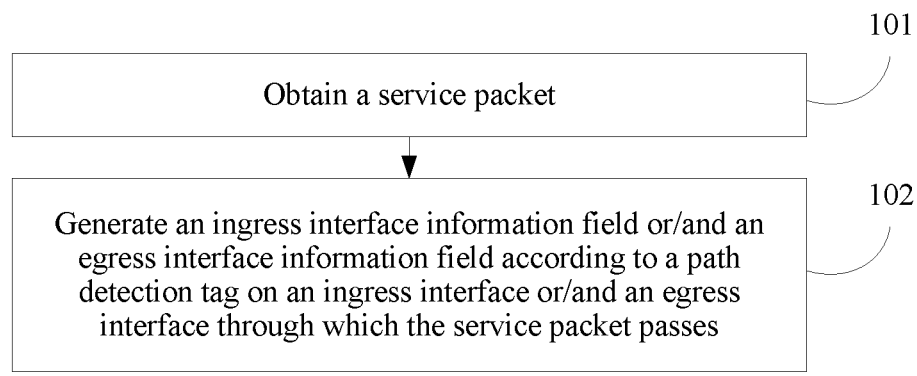
FIG. 1 is a flowchart of a method for obtaining path information according to an embodiment of this application.

An embodiment of this application provides a method for obtaining path information. The method is applied to a forwarding device, and the forwarding device may be a switch or a router. As shown in FIG. 1, the method includes the following steps.

S101. Obtain a service packet.

The service packet is a target service packet or an updated target service packet, the target service packet is a service packet that matches a flow rule, and the flow rule is used to obtain the service packet that matches the flow rule.

S102. Generate an ingress interface information field according to a path detection tag on an ingress interface through which the service packet passes.

Therefore, after the service packet is obtained, the ingress interface information field is generated according to the path detection tag on the ingress interface through which the service packet passes, and the ingress interface information field is included in the service packet and is forwarded.

In another implementation, S102 may be replaced by S103 in which an egress interface information field is generated according to a path detection tag on an egress interface through which the service packet passes. Therefore, after the service packet is obtained, the egress interface information field is generated according to the path detection tag on the egress interface through which the service packet passes, and the egress interface information field is included in the service packet and is forwarded.

In another implementation, S102 may be replaced by S104 in which the ingress interface information field and the egress interface information field are generated according to a first path detection tag on the ingress interface and a second path detection tag on the egress interface through which the service packet passes. Therefore, after the service packet is obtained, the ingress interface information field and the egress interface information field are generated according to the first path detection tag on the ingress interface and the second path detection tag on the egress interface through which the service packet passes, and the ingress interface information field and the egress interface information field are included in the service packet and are forwarded.

Compared with a method for consuming more network resources to analyze a sampling packet in the prior art, or a trace mechanism of the OAM protocol for which a forwarding path cannot be accurately detected, in the method in this embodiment of this application, the ingress interface information field and/or the egress interface information field are/is generated according to the path detection tag configured on the ingress interface and/or the egress interface of the forwarding device, and, the generated ingress interface information field and/or egress interface information field are/is carried in the received service packet and are/is forwarded to a destination node. Ingress interface information and/or egress interface information of the forwarding device is/are directly configured in the service packet according to an instruction of the path detection tag, to obtain a forwarding path of the service packet, so that the forwarding path of the service packet can be accurately obtained, and fewer network resources are consumed.

Optionally when the forwarding device is an ingress device, the path detection tag and the flow rule are preconfigured on an ingress interface of the ingress device, where the path detection tag used to instruct the forwarding device to configure the ingress interface information of the forwarding device. The ingress device is a device for initiating to forward the service packet. When obtaining a service packet, the ingress device determines whether a packet characteristic field included in the service packet matches flow rule on the ingress interface of the forwarding device, and the packet characteristic field included in the service packet matches the flow rule, determines that the service packet is a target service packet. There may be one or more flow rules on the ingress interface.

Optionally, when the forwarding device is an ingress device, the path detection tag and the flow rule are preconfigured on an egress interface of the ingress device, where the path detection tag is used to instruct the forwarding device to configure the egress interface information of the forwarding device. The ingress device is a device for initiating to forward the service packet. When obtaining the service packet, the ingress device determines whether a packet characteristic field included in the service packet matches a flow rule on the egress interface of the forwarding device, and if the packet characteristic field included in the service packet matches the flow rule, determines that the service packet is a target service packet. There may be one or more flow rules on the egress interface.

Optionally, when the forwarding device is an ingress device, the first path detection tag and a first flow rule are preconfigured on an ingress interface of the ingress device, where the first path detection tag is used to instruct the forwarding device to configure the ingress interface information of the forwarding device; and the second path detection tag and a second flow rule are preconfigured on an egress interface of the ingress device, where the second path detection tag is used to instruct the forwarding device to configure the egress interface information of the forwarding device. The ingress device is a device for initiating to forward the service packet. When obtaining the service packet, the ingress device determines whether a packet characteristic field included in the service packet matches a first flow rule on the ingress interface of the forwarding device, and if the packet characteristic field included in the service packet matches the first flow rule, determines that the service packet is a target service packet. There may be one or more flow rules on the ingress interface.

The flow rule is information that is defined by operation and maintenance management personnel and that is used to describe or match the packet characteristic field of the service packet. The flow rule is used to screen the service packet by a forwarding device on which a flow rule is configured. For example, the flow rule may be a characteristic of a service packet transmitted at a data link layer, and the characteristic of the service packet transmitted at the data link layer includes at least one of the following: a source MAC address, destination MAC address, an Ether an inner virtual local area network identification (VLAN ID), or an external VPAN ID. The service packet transmitted at the data link layer is mainly applied to a scenario of a data link layer virtual private network (VPN) or an Ethernet virtual private network (EVPN). The flow rule may be a characteristic of a service packet transmitted at a network layer, and the characteristic of the service packet transmitted at the network layer includes a source IP address, a destination IP address, a protocol type, a source port number, and a destination port number. An application scenario is mainly an IP network.

The ingress device generates first ingress interface information according to a path detection tag on an ingress interface through which the target service packet passes and that is of the ingress device, and includes the first ingress interface information in connectivity fault management information of the target service packet. The connectivity fault management information may further include an Ether type field, a connectivity fault management header field, and an end field, and the connectivity fault management information is located at a tail of an Ethernet packet of the service packet. The ingress device forwards the target service packet.

Optionally, the ingress device generates first egress interface information according to a path detection tag on an egress interface through which the target service packet passes and that is of the ingress device, and includes the first egress interface information in connectivity fault management information of the target service packet. The connectivity fault management information further includes an Ether type field, a connectivity fault management header field, and an end field, and the connectivity fault management information is located at a tail of an Ethernet packet of the service packet. The ingress device forwards the target service packet.

Optionally, the egress device generates first ingress interface information according to a path detection tag on an ingress interface through which the target service packet passes and that is of the ingress device. The ingress device generates a first egress interface information field according to a path detection tag on an egress interface through which the target service packet passes and that is of the ingress device. The ingress device includes the first ingress interface information and the first egress interface information in connectivity fault management information of the target service packet. The connectivity fault management information further includes an Ether type field, a connectivity fault management header field, and an end field, and the connectivity fault management information is located at a tail of an Ethernet packet of the service packet. The ingress device forwards the target service packet.

Based on the foregoing embodiments in this application, further, after the obtaining a service packet, a dummy packet of the target service packet may be generated according to a detection policy. The dummy packet is a new packet generated by duplicating a portion of the target service packet, and the new packet is used to obtain a forwarding path of the target service packet. The dummy packet may include a header that has a preset quantity of bytes and that is of the target service packet and the connectivity fault management information. A method for generating the dummy packet may include: duplicating and truncating the target service packet, calculating a remaining length of load of a truncated target service packet, and modifying a length field of an IP header of the truncated target service packet. The dummy packet may be terminated in a network, or may be discarded as an abnormal packet by a terminal host. Therefore, the dummy packet may be processed on a forwarding plane of the forwarding device, or the dummy packet may be processed and forwarded on a control plane. In this way, a length added to the service packet because path information is carried may be reduced. For an IP packet, a remaining length of load of the IP packet may be calculated, and a length field of the IP header is modified according to the remaining length of load of the IP packet. The path information is attached to a tail of a truncated packet, and a specific OAM flag is set on the IP header or an outer tunnel header of a packet, to indicate that the packet is an abnormal packet used for OAM detection. The dummy packet may be terminated on the network or discarded as an abnormal packet by the terminal host. Therefore, the dummy packet may be processed on a forwarding plane of the forwarding device, or may be processed and forwarded on a control plane. A relatively long forwarding delay caused by processing and forwarding on the control plane has no obvious impact on SPA of service traffic.

Specifically, the dummy packet of the target service packet may be generated by using either of the following manners: (1) Directly generate the dummy packet of the target service packet according to a detection policy. (2) Determine whether a length of the target service packet is greater than a preset threshold, and if the length of the target service packet is greater than the preset threshold, generate the dummy packet of the target service packet according to the target service packet.

The first ingress interface information field and/or the first egress interface information field and the connectivity fault management information are generated according to a path detection tau on an ingress interface and/or an egress interface through which the dummy packet of the target service packet passes. If the length of the target service packet is less than the preset threshold, the first ingress interface information and/or the first egress interface information is/are generated according to the path detection tag on the ingress interface and/or the egress interface through which the target service packet passes. The ingress device includes the first ingress interface information and the first egress interface information in the connectivity fault management information of the target service packet. The connectivity fault management information further includes an Ether type field, a connectivity fault management header field, and an end field, and the connectivity fault management information is located at a tail of an Ethernet packet of the service packet. The ingress device forwards the target service packet. The dummy packet includes a header that has a preset quantity of bytes and that is of the target service packet, and a packet mark used to identify the dummy packet is set at a preset location of the dummy packet.

Optionally, when the forwarding device is an intermediate device, a service packet obtained by the intermediate device is an updated target service packet, where the updated target service packet is a target service packet forwarded by the forwarding device, and the updated target service packet includes the connectivity fault management information. A path detection tag is preconfigured on an ingress interface and/or an egress interface of the intermediate device. A second ingress interface information field and/or a second egress interface information field is/are generated according to a path detection tag on an ingress interface and/or an egress interface through which the updated target service packet passes, to obtain another updated target service packet, where the another updated target service packet includes connectivity fault management information, the connectivity fault management information includes an Ether type field, a connectivity fault management header field, a first ingress interface information field and/or a first egress interface information field, the second ingress interface information field and/or the second egress interface information field, and an end field, and the connectivity fault management information is located at a tail of an Ethernet packet of the service packet; and the another updated target service packet is forwarded.

Optionally, when the forwarding device is an egress device, a path detection untag is preconfigured on the egress device, where the path detection untag is used to instruct the egress device to parse and extract the connectivity fault management information and a packet characteristic field that are of the updated target service packet. The egress device may further configure the path detection tag. After the obtaining a service packet, the service packet is parsed and extracted according to the path detection untag on the ingress interface and/or the egress interface through which the service packet passes, to obtain the connectivity fault management information and the packet characteristic field, where the connectivity fault management information includes an Ether type field, a connectivity fault management header field, one or more ingress interface information fields and/or one or more egress interface information fields, and an end field, the one or more ingress interface information fields and/or the one or more egress interface information fields form path information, the path information is used to indicate a forwarding path of the service packet in a forwarding path detection enabling network, and the service packet includes the connectivity fault management information and the packet characteristic field.

Further, when the service packet is a dummy packet, the service packet is discarded.

When the service packet is a normal packet, the connectivity fault management information is stripped, and the service packet continues to be forwarded.

A forwarding path information table of the flow rule is generated and saved according to the packet characteristic field and the path information, so that the forwarding path information table is queried by a network management device or is sent to a network controller.

Figure 2A:
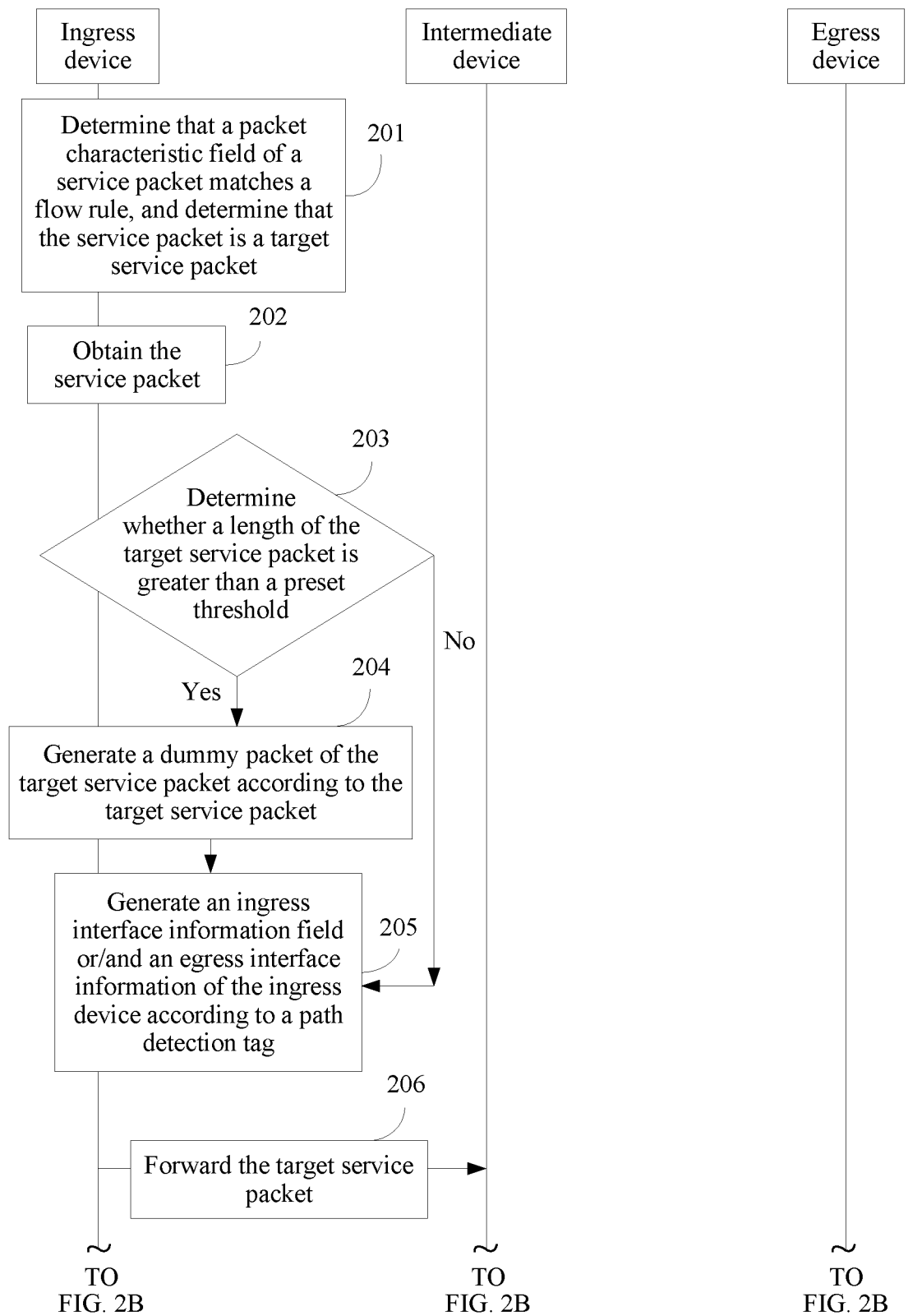
FIG. 2A and FIG. 2B are a flowchart of another method for obtaining path information according to an embodiment of this application.

An embodiment of this application provides a method for obtaining path information. As shown in FIG. 2A and FIG. 2E, the method includes the following steps.

S202. An ingress device obtains a service packet.

S201. If the ingress device determines that a packet characteristic field of the service packet matches a flow rule, the service packet is a target service packet.

The service packet includes the packet characteristic field. The flow rule may be configured into the ingress device by using a command-line interface (CLI) or a network management system (NMS) or by using a dynamic protocol such as the Border Gateway Protocol (BGP) Flowspec. The flow rule may be bound to an ingress interface or an egress interface of the ingress device according to a requirement of a flow direction (Ingress, Egress, or Both), so that a path detection tag is configured for the target service packet. Actual the configured flow rule is applied to a specific interface, and it may be specified that the flow rule effective for ingress traffic and/or egress traffic passing through the interface.

S203. The ingress device determines whether a length of the target service packet is greater than a preset threshold.

If the length of the target service packet is greater than the preset threshold, S204 is performed.

If the length of the target service packet is less than the preset threshold, S205 is performed.

S204. The ingress device generates a dummy packet of the target service packet according to the target service packet S205 performed.

Figure 3:
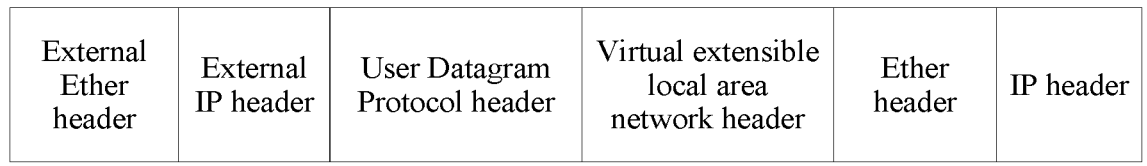
FIG. 3 is a schematic structural diagram of a service packet according to an embodiment of this application.

The dummy packet is a new packet generated by duplicating a portion of the target service packet, and the new packet is used to obtain a forwarding path of the target service packet. The dummy packet may include a header that has a preset quantity of bytes and that is of the target service packet and connectivity fault management information. A packet mark used to identify the dummy packet is set at a preset location of the dummy packet. The preset quantity of bytes may be 96 bytes. For example, a virtual extensible local area network (VXLAN) packet header may include a flag bit of associated path detection. As shown in FIG. 3, a mark of the dummy packet may be carried in an external Ether header, an external IP header, and a VXLAN header (OAM flag) after a User Datagram Protocol (UDP) header. If the length of the target service packet is less than a preset quantity of bytes, the target service packet is filled with default data so that the length of the generated dummy packet reaches the preset quantity of bytes. In this way, by using the dummy packet similar to the target service packet, the connectivity fault management information carried in the target service packet can be effectively recorded, and this can avoid a deficiency that the forwarding path of the service packet cannot be accurately obtained because the connectivity fault management information cannot be carried when the length of the target service packet is greater than the preset threshold.

A method for generating the dummy packet may include: duplicating and truncating the target service packet, calculating a remaining length of load of a truncated target service packet, and modifying a length field of an IP header of the truncated target service packet. The dummy packet may be terminated in a network, or may be discarded as an abnormal packet by a terminal host. Therefore, the dummy packet may be processed on a forwarding plane of the forwarding device, or the dummy packet may be processed and forwarded on a control plane.

Optionally, for a normal unicast forwarding packet, when the connectivity fault management information is configured, a path maximum transmission unit (PMTU) TLV may be carried in the unicast forwarding packet. The forwarding device may know a PMTU of a network through which a current service forwarding packet passes. For example, a PMTU between an Ingress network virtualization edge (NVE) and an Egress NVE in a network virtualization (network over layer 3 (NVO3), a network layer) may be detected in advance, or a PMTU is carried in received connectivity fault management information. The forwarding device checks according to min (PMTU, an MTU of an egress interface), or the forwarding device directly checks according to an MTU of an egress interface whether there is remaining space in the current forwarding packet to attach new path information. If space is insufficient, the new path information is not attached, and only a specific mark is set on a CFM header of the connectivity fault management information attached before the packet, to indicate to stop attaching path information.

S205. The ingress device generates ingress interface information and/or egress interface information of the ingress device according to a path detection tag.

The ingress device may be any forwarding device on which a flow rule is configured. The path detection tag is preconfigured on the ingress device. The path detection tag is used to instruct the forwarding device to configure the ingress interface information or the egress interface information of the forwarding device.

The ingress device generates a first ingress interface information field and/or a first egress interface information field of the ingress device according to a path detection tag on an ingress interface and/or an egress interface through which the target service packet passes. The target service packet includes the connectivity fault management information, and the connectivity fault management information includes an Ether type field, a connectivity fault management (CFM) header field, the first ingress interface information (e.g., Forwarding Port TLV1) field and/or/or the first egress interface information (e.g., Forwarding Port TLV2) field, and an end TLV field. A value of the Ether type field may be 0×8902, and the connectivity fault management information is located at a tail of an Ethernet packet of the service packet, for example, may be a tail of a protocol data unit (PDU).

It should be noted that, the connectivity fault management information may further include a flow identifier TLV (Flow-id TLV) and the flow identifier TLV is located after a connectivity fault management (CFM) header field and before Forwarding Port TLV.

In particular, the target service packet may be selected by means of time sampling or per-ratio sampling to configure path information, such as 100 ms or 1 s, or 1:100 or 1:10000.

S206. The ingress device forwards the target service packet to an intermediate device.

The ingress device may forward the target service packet to the intermediate device according to forward information base (FIB) information of the ingress device. For example, a switch forwards a packet mainly according to a MAC address forwarding table, and a router forwards a packet mainly according to a routing table.

The target service packet includes a packet characteristic and the connectivity fault management information.

S207. The intermediate device generates ingress interface information and/and/or egress interface information of a forwarding device according to a path detection tag.

After the intermediate device receives the target service packet, if a path detection tag is configured on an ingress interface and/or an egress interface of the intermediate device, the intermediate device generates second ingress interface information and/or second egress interface information, and adds the second ingress interface information and/or the second egress interface information to the connectivity fault management information of the target service packet to obtain an updated target service packet. Specifically, the intermediate device may add the second ingress interface information and/or the second egress interface information to Forwarding Port TLV3 at the target service packet to obtain the updated target service packet.

Optionally, before configuring the path information, the intermediate device may further check a packet header of the received target service packet, if the packet header greater than a preset length, continue to detect whether two bytes of the loaded packet header are 0×8902, and if the two bytes of the loaded packet header are 0×8902, continue to parse packet content having a remaining length according to a connectivity fault management protocol format. If there is no error during parsing, the target service packet includes the connectivity fault management information that carries the path information, and the path information is further added before the end field (END TLV).

Optionally, the ingress interface information may be an identifier of the ingress interface or an IP address of the ingress interface. The egress interface information may be an identifier of the egress interface or an IP address of the egress interface.

S208. The intermediate device forwards an updated target service packet to an egress device.

The egress device may be any forwarding device on which a path detection untag is configured. The path detection untag is used to instruct the forwarding device to parse and extract connectivity fault management information and a packet characteristic that are of the updated target service packet. The egress device may further preconfigure the path detection tag.

The updated target service packet includes the packet characteristic and the ingress interface information and/or the egress interface information of the forwarding device.

The intermediate device may forward the target service packet to the egress device according to forward inform base (FIB) information of the intermediate device. For example, a switch forwards a packet mainly according to a MAC forwarding table, and a router forwards a packet mainly according to a routing table.

It should be noted that, some intermediate devices may be forwarding nodes for transparently transmitting the target service packet. If no path detection tag or path detection untag is configured on an ingress interface (Ingress) or an egress interface (Egress) of the intermediate device, the target service packet is normally processed, there is no need to add the path information, and the connectivity fault management information that is carried in the target service packet is also not stripped.

S209. The egress device parses and extracts the updated target service packet according to a path detection untag to obtain the connectivity fault management information and the packet characteristic field.

The connectivity fault management information includes an Ether type, a connectivity fault management header, the first ingress interface information and/or the first egress interface information, the second ingress interface information and/or the second egress interface information, and an end field, and the updated target service packet includes the packet characteristic. The one or more pieces of ingress interface information and/or one or more pieces of egress interface information form path information, and the path information is used to indicate a forwarding path of the service packet in a forwarding path detection enabling network.

The egress device may be a sink node of the updated target service packet, or a forwarding device on which a path detection untag (untag) is configured. The sink node means that a service packet is a local service packet or a multicast service packet that needs to be terminated locally. For example, a destination IP address of the updated target service packet is a local IP a dress of the egress device, and this service packet has no next hop information in a hit forwarding information table searched from the egress device. After the egress device receives the updated target service packet, if the path detection untag is configured on the ingress interface of the egress device, the egress device parses the updated target service packet to obtain the connectivity fault management information and the packet characteristic.

S2010. When the updated target service packet is a dummy packet, the egress device discards the updated target service packet.

S2011. When the updated target service packet is a normal packet, the egress device strips the connectivity fault management information, and continues to forward the updated target service packet.

S2012. The egress device generates forwarding path information table according to the packet characteristic and the path information, and saves the forwarding path information table, so that the forwarding path information tab is queried by a network management device or is sent to a network controller.

The egress device saves the extracted packet characteristic and path information corresponding to the packet characteristic into a management information base (MIB), so as to be queried by a measurement control point to be actively reported to a measurement control point. The measurement control point may be a network management device or a network controller.

It should be noted that, before the parsing the updated target service packet according to a path detection untag, ingress interface information and/or egress interface information of the egress device may be further generated according to a path detection tag on an ingress interface and/or an egress interface through which the updated target service packet passes and that is/are of the egress device.

Figure 4A:
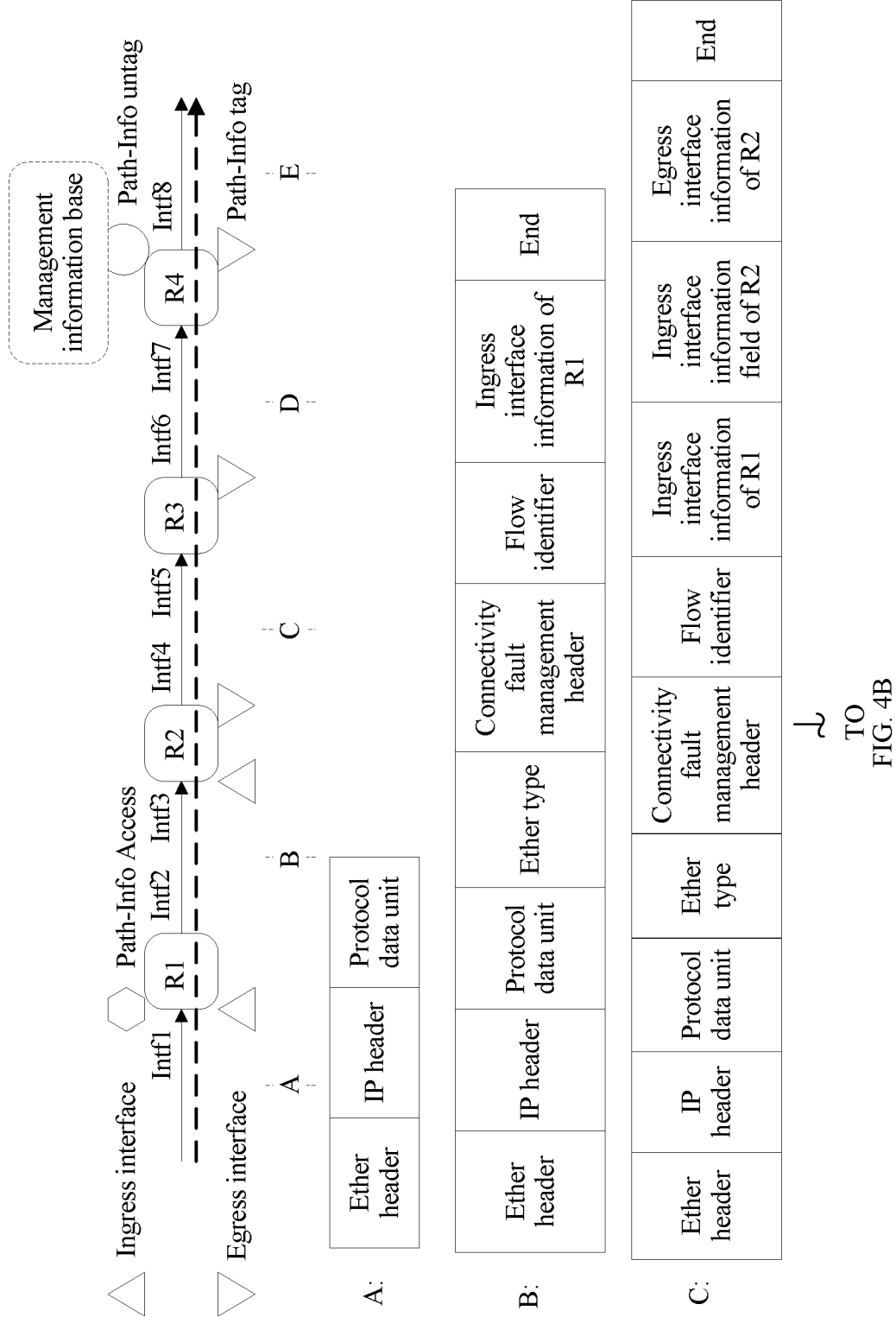

As shown in FIG. 4A and FIG. 4B, it is assumed that R1 obtains a service packet, and a flow rule preconfigured on R1. It is determined that a packet characteristic of the service packet matches the flow rule, and it is determined that the service packet is a target service packet. Then, the target service packet is forwarded by R2 and R3. R4 is an egress interface device for the target service packet.

In addition, a path detection tag (Path-Info) is separately configured on an ingress interface of R1, an ingress interface and an egress interface of R2, an egress interface of R3, and an egress interface of R4, and a path detection untag (Path-Info untag) is further configured in R4. R1, R2, R3, and R4 are network devices, and may be routing devices or switching devices.

The target service packet is forwarded by R1, R2, and R4. As shown is FIG. 4, a packet for the target service packet at a point A includes an Ether header, an IP header, and a protocol data unit (PDU)). The point A is a location before R1 along a path that the target service packet passes from R1, R2, and R3 to R4.

A packet for the target service packet at a point B includes an Ether header, an IP header, a protocol data unit (PDU), an Ether type field (Ether Type=0×8902), a connectivity fault management (CFM) header field, an end field (End TLV), a flow identifier (Flow-id TLV), and an ingress interface information field (Forwarding Port TLV 1) of R1. The point B is a location between R1 and R2 along a path that the target service packet passes from R1, R2, and R3 to R4.

It should be noted that, a flow identifier field is optional for carrying, and may be configured by operation and maintenance personnel when configuring the flow rule in an ingress device. Actually, the flow rule and the flow-id are in one-to-one mapping, to simplify an identifier of a packet. Even though there is no flow-id, the flow rule may continue to be used to identify the service packet. When a specific packet is matched for the flow rule of the ingress device, the ingress device adds CFM information to a tail of the specific packet or to a tail of a dummy packet duplicated from the specific packet. The CFM information includes an Ether type corresponding to CFM, a CFM header, a Flow-ID TLV, and an End TLV.

A packet for the target service packet at a point C includes an Ether header, an IP header, a protocol data unit (PDU), an Ether type field (Ether Type=0×8902), a connectivity fault management (GEM) header field, an end field (End TLV), a flow identifier field (Flow-id TIN), an ingress interface information field (Forwarding Port TLV 1) of R1, an ingress interface information field (Forwarding Port TLV 2) of R2, and an egress interface information field (Forwarding Port TLV 3) of R2. The point C is a location between R2 and R3 along a path that the target service packet passes from R1, R2, and R3 to R4.

A packet for the target service packet at a point D includes an Ether header, an IP header, a protocol data unit (PDU), an Ether type field (Ether Type=0×8902), a connectivity fault management (CFM) header field, an end field (End TLV), a flow identifier field (Flow-id TLV), an ingress interface information field (Forwarding Port TLV 1) of R1, an ingress interface information field (Forwarding Port TLV 2) of R2, an egress interface information field (Forwarding Port TLV 3) of R2, and an egress interface information field (Forwarding Port TLV 4) of R3. The point D is a location between R3 and R4 along a path that the target service packet passes from R1, R2, and R3 to R4.

A packet for the target service packet at a point E is parsed by R4 according to the path detection untag to obtain path information of the target service packet. The packet for the target service packet at the point E includes an Ether header, an IP header, and a protocol data unit (PDU). R4 saves the path information into a management information base (MIB).

Figure 13:
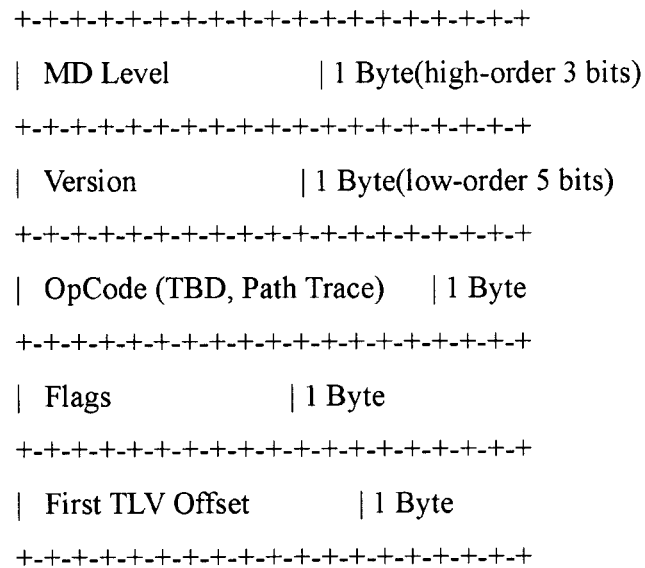
FIG. 13 is a schematic structural diagram of a coding format according to an embodiment of this application.

For example, content of the path information multiplexes a connectivity fault management (CFM) header defined in 802.1AG, for example, an Ether type is 0×8902. As shown in FIG. 13, it is a coding format, and a new operation type (OpCode=TBD) identifier Path Trace is defined. Different values of operation code (Op Code) of CFM indicate to perform different operations to implement different functions.

MD Level indicates a level, Version indicates a version, Flags indicate an identifier, and First TLV Offset indicates setting for a first type length value.

Figure 14:
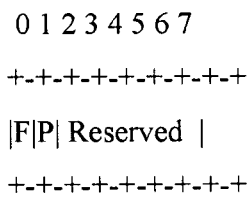
FIG. 14 is a schematic structural diagram of flags of the coding format in FIG. 13 according to an embodiment of this application.

When OpCode is equal to Path Trace, Flags are defined in FIG. 14.

A mark F is used to indicate whether the target service packet a normal forwarding packet. Setting the mark F to 1 indicates a normal packet, and setting the mark F to 0 indicates a dummy packet, which duplicates a packet characteristic field of the normal forwarding packet.

A mark P is used to indicate an end configuration mark. Because of a path maximum transmission unit (PMTU) space for carrying the path information by the target service packet is not enough, and an ingress interface or an egress interface stops to be configured.

In the target service packet, two new type length values (TLVs) are defined, that is, Forwarding Port and PMTU.

| Type (Type) | Type Length Value Name (TLV Name) | Version (Standard/ RFC/Draft) |
|---|---|---|
| 0 | End (end) | IEEE 802.1AG |
| 1 | Sender ID (sender identifier) | IEEE 802.1AG |
| 2 | Port Status (port status) | IEEE 802.1AG |
| 3 | Data (data) | IEEE 802.1AG |
| 4 | Interface Status (interface status) | IEEE 802.1AG |
| 5 | Reply Ingress (reply ingress) | IEEE 802.1AG |
| 6 | Reply Egress (reply egress) | IEEE 802.1AG |
| 7 | LTM Egress Identifier (LTM egress identifier) | IEEE 802.1AG |
| 8 | LTR Egress Identifier (LTR egress identifier) | IEEE 802.1AG |
| 9-30 | Reserved (reserved) | |
| 31 | Organization Specific (specific organization) | IEEE 802.1AG |

TBD-TLV-64 OAM Application Identifier (OAM application identifier) draft-tissa-nvo3-oam-fm-01

TBI)-TLV-65 Out of Band IP Address (out of band address) draft-tissa-nvo3-oam-fm-01

TBD-TLV-66 Original Payload (original payload) draft-tissa-nvo3-oam-fm-01

TBD-TLV-67 Diagnostic FLAN (diagnostic FLAN) draft-cissa-nvo3-oam-fm-01

TBD-TLV-68 scope (scope) draft-tissa-nvo3-oath-fm-01

TBD-TLV-69 Previous Device address draft-Cissa-nvo3-oam-fm-01

TBD-TLV-70 Next Hop Device List (ECMP) draft-tissa-nvo3-oam-fm-01

TBD-TLV-71 Multicast Receiver Availability (multicast receiver availability) draft-tissa-nvo3-oam-fm-01

TBD-TLV-72 Flow Identifier (flow identifier) draft-tissa-nvo3-oam-fm-01

TBD-TLV-73 Reflector Entropy (reflector entropy) draft-tissa-nvo3-oam-fm-01

TBD-TLV-74 Forwarding Port (forwarding port) new

TBD-TLV-75 PMTU new

TBD-TLV-76 to TBD-TLV-95 Reserved (reserved)

As shown in FIG. 15, it is an example of a coding format of Forwarding Port TLV.

A definition of Node ID Type uses a definition of chassis ID subtype of Classis ID TLV of IEEE 802.1AB.

A definition of Node ID uses a definition of chassis ID of Classis ID TLV of IEEE 802.1AB, and a specific value type is a type defined by Node ID Type. The Node ID is used to indicate an identifier of the forwarding device.

Forwarding Port Desc Length is a String Length of Forwarding Port Desc.

Forwarding Port Description is description of a forwarding interface, and the interface may be a physical interface on the forwarding device, or may be a virtual interface.

Physical Port Desc Length and Physical Port Description are optional fields, and exist only when the forwarding interface is a virtual interface.

Flags are defined in FIG. 16.

A mark I is used to indicate whether an interface is an ingress interface. Setting the mark I to 1 it an ingress interface, and setting the mark I to another value except 1 indicates an egress interface.

A mark V is used to indicate that an ingress interface or an egress interface is a virtual interface, such as a Smartgroup interface, an MPPP interface, or a SuperVLAN interface. In this case, the two fields "Physical Port Desc Length" and "Physical Port Description" are valid.

As shown in FIG. 17, it is an example of a coding format of PMTU TLV.

For example, it is assumed that a network management system (NMS) configures a path detection tag on a corresponding interface of a network virtualization edge (NVE) 1, an NVE 2, an NVE gateway (GW), a Spine switch (SW) 1, a Spine SW 2, and a Spine SW 3, and configures a path detection untag on the NVE 2. A flow rule is configured on an ingress interface of the NVE 1, to match a service packet generated when a VM 1 of a tenant A in a subnetwork B accesses a VM 2 of the tenant A in a subnetwork C, so as to detect a forwarding path of the service packet in a data center switching network. Per-period sampling is configured, and one packet is sampled within 100 milliseconds (ms).

The NVE 1 matches, according to the flow rule within a sampling period, a service packet received from the ingress interface, and if the service packet matches the preconfigured flow rule, determines that the service packet is a target service packet. The NVE 1 configures path information for the target service packet. The path information includes an Ether type 0×8902, a CFM header, Forwarding Port TLV, and End TLV. The NVE 1 searches for a forwarding information table in the NVE 1 according to a virtual local area network ID (VLAN ID) of the target service packet and a MAC address of the NVE 1, to obtain VXLAN tunnel encapsulation information. For example, a destination of a VXLAN tunnel is an NVE GW. The NVE 1 adds VXLAN tunnel encapsulation to the target service packet, searches for a route according to an outer destination IP address of the VXLAN tunnel, and if there are multiple equal-cost paths, selects passing through a Spine SW 1 to forward an encapsulated target service packet to the NVE GW. A value of a Length field in a VXLAN tunnel outer IP header does not include a packet content length of the path information.

After receiving the target service packet, the Spine SW 1 configures Forwarding Port TLV 2 corresponding to the ingress interface before the End TLV field according to the path detection tag, continues to search for the MAC forwarding information table to obtain an egress interface of the packet, finds, by means of checking, that the path detection tag is configured on the egress interface, configures Forwarding Port TLV 3 corresponding to the egress interface before the End TLV field, and then sends the target service packet to the NVE GW.

After receiving the target service packet, the NVE GW strips the VXLAN tunnel encapsulation, searches for a route according to a VXLAN network identifier (VNI) and an inner IP header that are of the VXLAN header, and determines that a next hop of the target service packet is the NVE 2. The NVE GW first modifies an inner Ether header of the target service packet according to corresponding Address Resolution Protocol (ARP) information, changes the destination MAC address of the target service packet to a MAC address of the VM 2, then performs VXLAN tunnel encapsulation of the NVE 2 for the target service packet, searches for a route according to an outer destination IP address of the VXLAN tunnel, selects a path passing through the Spine SW 2 to forward an encapsulated packet to the NVE 2, before forwarding the encapsulated packet to the NVE 2, checks a path detection tag configured or an egress interface of the encapsulated packet, configures Forwarding Port TLV 4 corresponding to the egress interface before the End TLV field, and then sends the target service packet to the Spine SW 2.

After receiving the target service packet, the Spine SW 2 finds, by means of checking, that the path detection tag is configured on the ingress interface, configures Forwarding Port TLV 5 corresponding to the ingress interface before the End TLV field, continues to search for the MAC forwarding information table to obtain an egress interface of the packet, finds, by means of checking, that the path detection tag is configured on the egress interface, configures Forwarding Port TLV 6 corresponding to the egress interface before the End TLV field, and then sends the target service packet to the NVE 2.

After receiving the target service packet, the NVE 2 strips the VXLAN tunnel encapsulation, searches for the MAC forwarding information table according to VNI and an inner MAC header of the VXLAN header to obtain an egress interface (that is, the ingress interface of the NVE 2) of the target service packet, finds, by means of checking, that the path detection untag is configured on the egress interface, strips routing information from a tail of the target service packet, extracts characteristic information of the target service packet, saves the characteristic information and the path information into an MIB of the path information to be queried and used by an NMS, and forwards the packet to the VIM 2.

Figure 5:
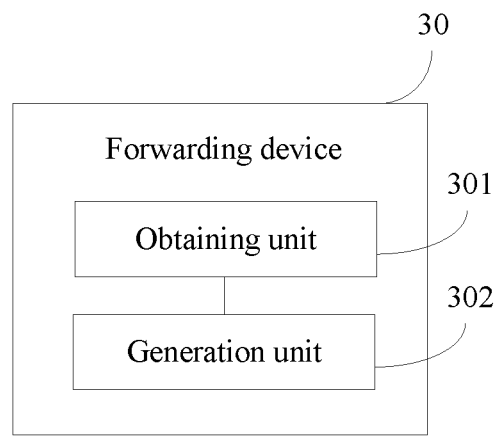
FIG. 5 is a schematic structural diagram of a forwarding device according to an embodiment of this application.

An embodiment of this application provides a forwarding device 30, as shown in FIG. 5, including:

an obtaining unit 301, configured to obtain a service packet, where the service packet is a target service packet or an updated target service packet, the target service packet is a service packet that matches a flow rule, and the flow rule is used to obtain the service packet that matches the flow rule; and a generation unit 302, configured to generate an ingress interface information field and/or an egress interface information field according to a path detection tag on an ingress interface and/or an egress interface through which the service packet passes.

In this way, after the service packet is obtained, the ingress interface information field and/or the egress interface information field is/are generated according to the path detection tag on the ingress interface and/or the egress interface through, which the service packet passes. Compared with a method for consuming more network resources to analyze a sampling packet in the prior art, or a track mechanism of the OAM protocol for which a forwarding path cannot be accurately detected, in the method in this embodiment of this application, the path detection tag is configured in the forwarding device, the ingress interface information and/or the egress interface information of the forwarding device is/are directly configured in the service packet according to the instruction of the path detection tag, to obtain the forwarding path of the service packet, so that the forwarding path of the service packet can be accurately obtained, and fewer network resources are consumed.

Figure 6:
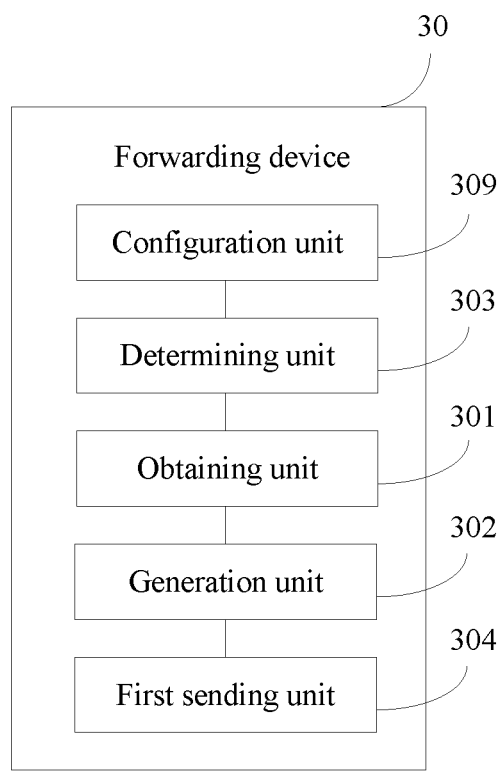
FIG. 6 is a schematic structural diagram of another forwarding device according to an embodiment of this application.

When the forwarding device is an ingress device, the service packet is a target service packet. As shown in FIG. 6, the forwarding device 30 further includes a determining unit 303 and a first sending unit 304.

The determining unit 303 is configured to determine that a packet characteristic field of the service packet matches the flow rule, and determine that the service packet is the target service packet, where the service packet includes the packet characteristic field.

The flow rule is information that is defined by operation and maintenance management personnel and that is used to describe or match the packet characteristic field of the service packet. The flow rule is used to screen the service packet by a forwarding device on which a flow rule is configured. For example, a flow rule may be a characteristic of a service packet transmitted at a data link layer (L2), where the characteristic of the service packet transmitted at L2 includes a source MAC, a destination MAC, an Ether type, an inner virtual local area network identification ID (VLAN ID), and an external VLAN ID, and is mainly applied to a scenario of an L2 virtual private network (VPN) or an Ethernet virtual private network (EVPN). The flow rule may be a characteristic of a service packet transmitted at a network layer (L3), and the characteristic of the service packet transmitted at L3 includes a source IP, a destination IP, a protocol type, a source port, and a destination port. An application scenario is mainly an IP network.

The generation unit 302 is specifically configured to:

generate a first ingress interface information field and/or a first egress interface information field and connectivity fault management information according to the path detection tag on the ingress interface and/or the egress interface through which the target service packet passes, where the target service packet includes the connectivity fault management information, the connectivity fault management information includes an Ether type field, a connectivity fault management header field, the first ingress interface information field and/or the first egress interface information field, and an end field, and the connectivity fault management information is located at a tail of an Ethernet packet of the service packet.

The first sending unit 304 is configured to forward the target service packet.

The generation unit 302 is further configured to:

generate a dummy packet of the target service packet according to a detection policy, where the dummy packet includes the connectivity fault management information.

The generation unit 302 is specifically configured to:

directly generate the dummy packet of the target service packet according to an instruction of the detection policy; or determine whether a length of the target service packet is greater than a preset threshold;

if the length of the target service packet is greater than the preset threshold, generate the dummy packet of the target service packet according to the target service packet, and generate the first ingress interface information field and/or the first egress interface information field and the connectivity fault management information according to the path detection tag on the ingress interface and/or the egress interface through which the dummy packet of the target service packet passes; or if the length of the target service packet is less than the preset threshold, generate the first ingress interface information field and/or the first egress interface information field and the connectivity fault management information according to the path detection tag on the ingress interface and/or the egress interface through which the target service packet passes, where the dummy packet further includes a header that has a preset quantity of bytes and that is of the target service packet, and a packet mark used to identify the dummy packet is set at a preset location of the dummy packet.

In this way, by using the dummy packet similar to the target service packet, the connectivity fault management information carried in the target service packet can be effectively recorded, and this can avoid a deficiency that the forwarding path of the service packet cannot be accurately obtained because the connectivity fault management information cannot be carried when the length of the target service packet is greater than the preset threshold.

When the forwarding device is an intermediate device, the service packet is the updated target service packet. The generation unit 302 is specifically configured to:

generate a second ingress interface information field and/or a second egress interface information field according to a path detection tag on an ingress interface and/or an egress interface through which the updated target service packet passes, to obtain another updated target service packet, where the another updated target service packet includes connectivity fault management information, the connectivity fault management information includes an Ether type field, connectivity fault management header field, a first ingress interface information field and/or a first egress interface information field, the second ingress interface information field and/or the second egress interface information field, and an end field, and the connectivity fault management information is located at a tail of an Ethernet packet of the service packet.

Figure 7:
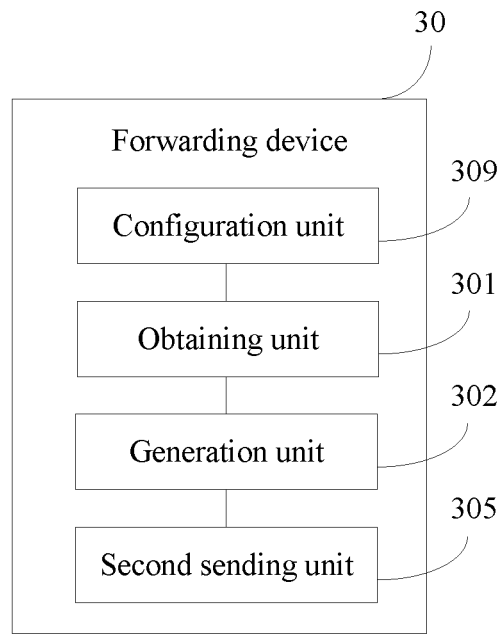
FIG. 7 is a schematic structural diagram of still another forwarding device according to an embodiment of this application.

As shown FIG. 7, the forwarding device 30 further includes:

a second sending unit 305, configured to forward the another updated target service packet.

Figure 8:
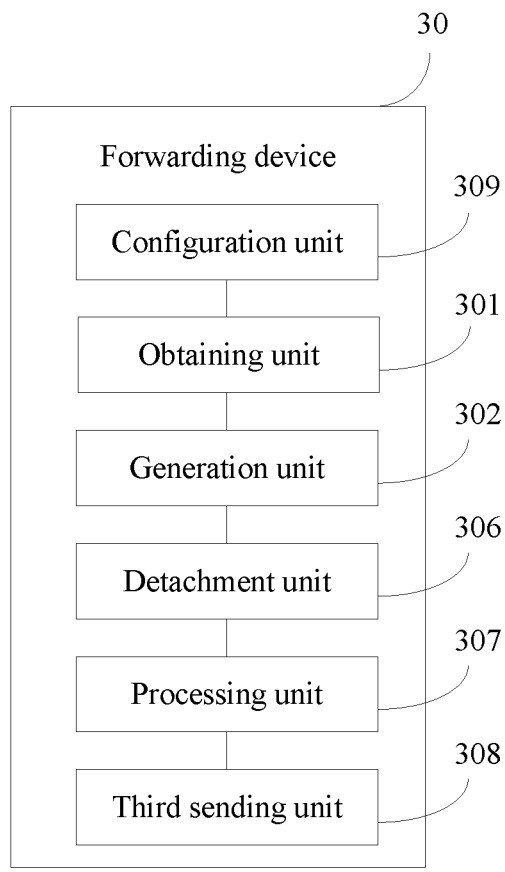
FIG. 8 is a schematic structural diagram of yet another forwarding device according to an embodiment of this application.

When the forwarding device is an egress device as shown in FIG. 8, the forwarding device 30 further includes:

a detachment unit 306, configured to parse and extract the service packet according to a path detection untag on the ingress interface and/or the egress interface through which the service packet passes, to obtain connectivity fault management information and a packet characteristic field, where the connectivity fault management information includes an Ether type field, a connectivity fault management header field, one or more ingress interface information fields and/or one or more egress interface information fields, and an end field, the one or more ingress interface information fields and/or the one or more egress interface information fields form path information, the path information is used to indicate a forwarding path of the service packet in forwarding path detection enabling network, and the service packet includes the connectivity fault management information and the packet characteristic field;

a processing unit 307, configured to: when the service packet is a dummy packet, discard the service packet; and a third sending unit 308, configured to: when the service packet is a normal packet, strip the connectivity fault management information, and continue co forward the service packet, where the processing unit 307 is further configured to generate and save a forwarding path information table of the flow rule according to the packet characteristic field and the path information so that the forwarding path information table is queried by a network management device or is sent to a network controller.

The forwarding device 30 further includes:

a configuration unit 309, configured to preconfigure at least one of the path detection tag, the path detection untag, or the flow rule, where the path detection tag is used to instruct the forwarding device configure the ingress interface information or the egress interface information of the forwarding device, and the path detection untag is used to instruct the forwarding device to parse and extract connectivity fault management information and a packet characteristic field of an updated target service packet.

Optionally, the forwarding device 30 may be a router or a switch.

Figure 2B:
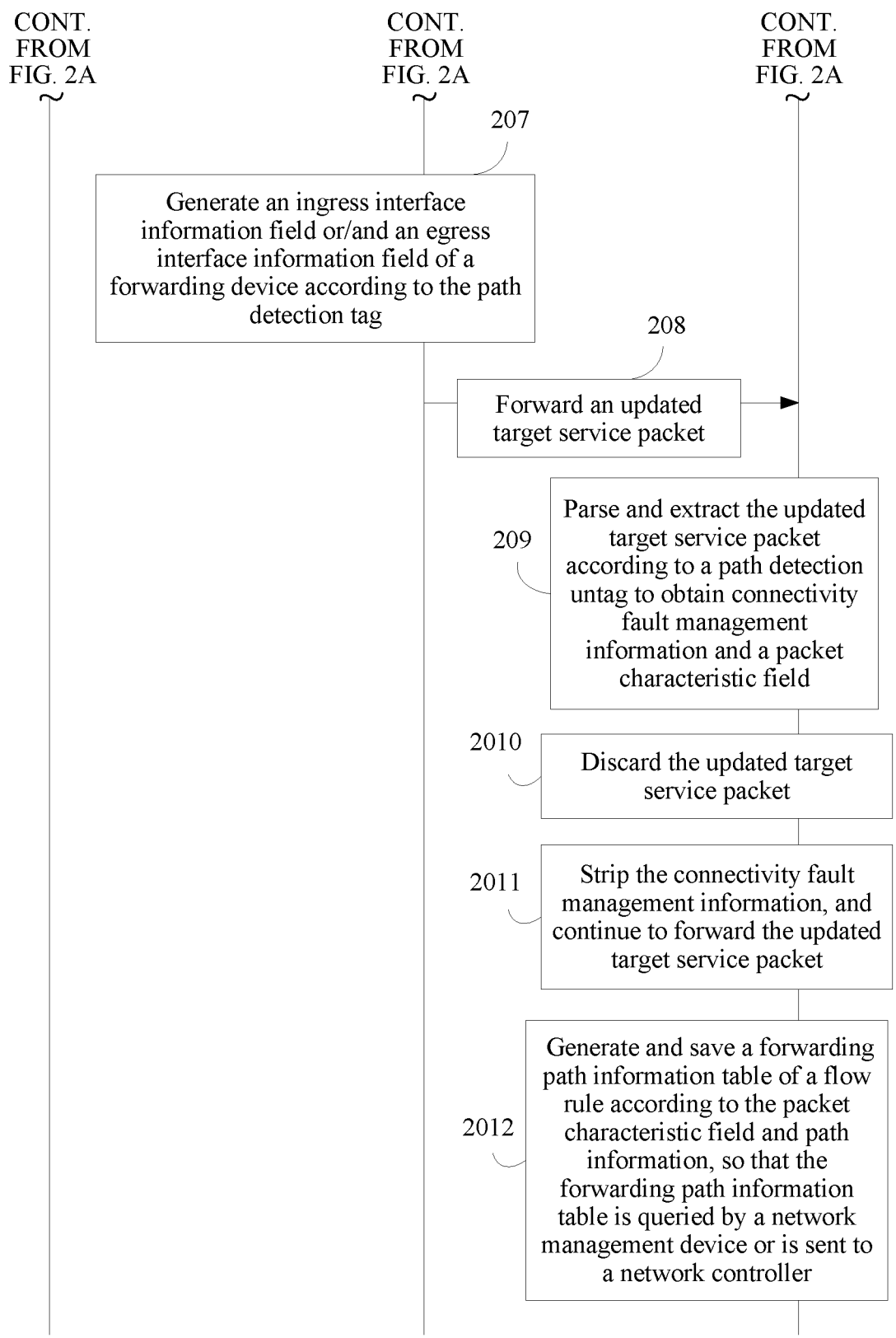

Optionally, the forwarding device 30 may perform the method embodiment corresponding to FIG. 1 or FIG. 1A and FIG. 2B.

Figure 9:
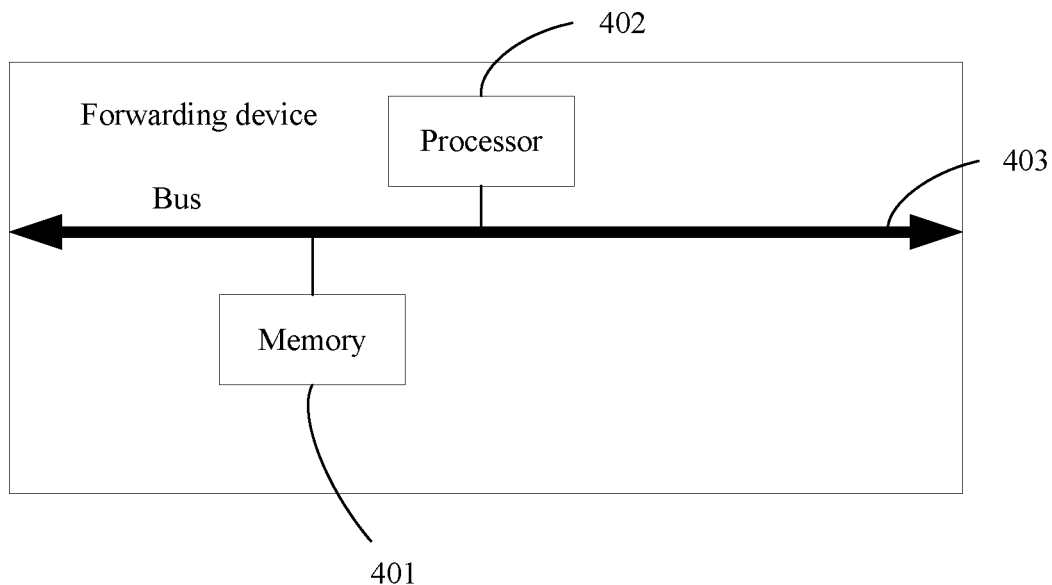
FIG. 9 is a schematic structural diagram of still yet another forwarding device according to an embodiment of this application.

An embodiment of this application provides a forwarding device 40, as shown in FIG. 9, including:

a memory 401, configured to store program code; and a processor 402, configured to invoke the program code stored in the memory to execute the following method:

obtaining a service packet, where the service packet is a target service packet or an updated target service packet, the target service packet is a service packet that matches a flow rule, and the flow rule is used to obtain the service packet that matches the flow rule, where the processor is further configured to generate an ingress interface information field and/or an egress interface information field according to a path detection tag on an ingress interface and/or an egress interface through which the service packet passes; and a bus 403, configured to connect the processor 402 and the memory 401 by using the bus, and complete mutual communication.

In this way, after the service packet is obtained, the ingress interface information field and/or the egress interface information field is/are generated according to the path detection tag on the ingress interface and/or the egress interface through which the service packet passes. Compared with a method for consuming more network resources to analyze a sampling packet in the prior art, or track mechanism of the OAM protocol for which a forwarding path cannot be accurately detected, in the method in this embodiment of this application, the path detection tag is configured in the forwarding device the ingress interface information and/or the egress interface information of the forwarding device is/are directly configured in the service packet according to the instruction of the path detection tag, to obtain the forwarding path of the service packet, so that the forwarding path of the service packet can be accurate obtained, and fewer network resources are consumed.

The processor 402 is further configured to:

determine that a packet characteristic field of the service packet matches the flow rule, and determine that the service packet is the target service packet, where the service packet includes the packet characteristic field.

The processor 402 is specifically configured to:

generate a first ingress interface information field and/or a first egress interface information field and connectivity fault management information according to the path detection tag on the ingress interface and/or the egress interface through which the target service packet passes, where the target service packet includes the connectivity fault management information, the connectivity fault management information includes an Ether type field, a connectivity fault management header field, the first ingress interface information field and/or the first egress interface information field, and an end field, and the connectivity fault management information is located at a tail of an Ethernet packet of the service packet.

Figure 10:
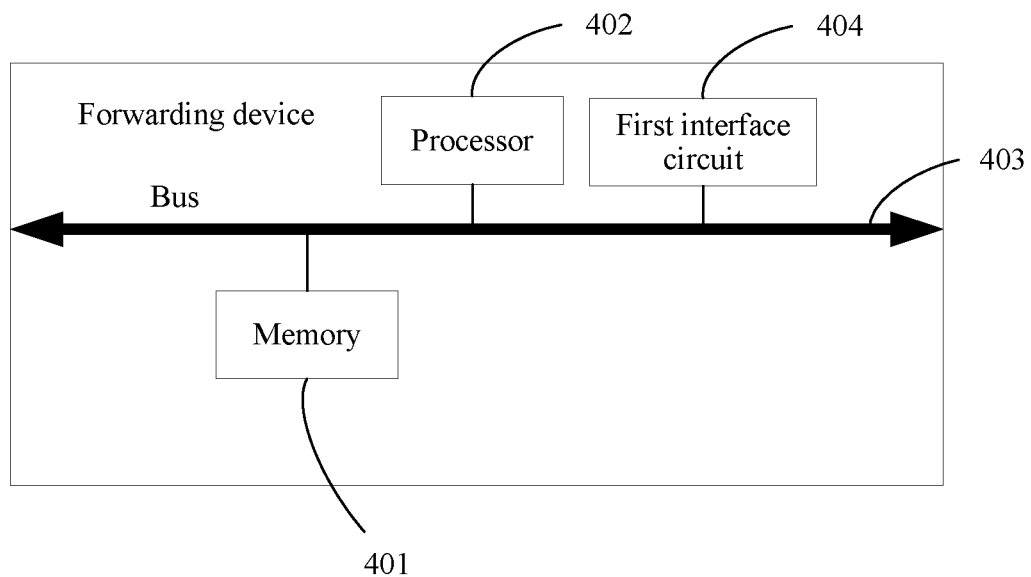
FIG. 10 is a schematic structural diagram of a further forwarding device according to an embodiment of this application.

As shown in FIG. 10, the forwarding device 40 further includes:

first interface circuit 404, configured to forward the target service packet.

The processor 402 is further configured to:

generate a dummy packet of the target service packet according a detection policy, where the dummy packet includes the connectivity fault management information.

The processor 402 is specifically configured to:

directly generate the dummy packet of the target service packet according to an instruction of the detection policy; or determine whether a length of the target service packet is greater than a preset threshold;

if the length of the target service packet is greater than the preset threshold, generate the dummy packet of the target service packet according to the target service packet, and generate the first ingress interface information field and/or the first egress interface information field and the connectivity fault management information according to the path detection tag on the ingress interface and/or the egress interface through which the dummy packet of the target service packet passes; or if the length of the target service packet is less than the preset threshold, generate the first ingress interface information field and/or the first egress interface information field and the connectivity fault management information according to the path detection tag on the ingress interface and/or the egress interface through which the target service packet passes, where the dummy packet further includes a header that has a preset quantity of bytes and that is of the target service packet, and a packet mark used to identify the dummy packet is set at a preset location of the dummy packet.

In this way, by using the dummy packet similar to the target service packet the connectivity fault management information carried in the target service packet can be effectively recorded, and this can avoid a deficiency that the forwarding path of the service packet cannot be accurately obtained because the connectivity fault management information cannot be carried when the length of the target service packet is greater than the preset threshold.

When the forwarding device is an intermediate device, the service packet is the updated target service packet. The processor 402 is specifically configured to:

generate a second ingress interface information field and/or a second egress interface information field according to a path detection tag on an ingress interface and/or an egress interface through which the updated target service packet passes, to obtain another updated target service packet, where the another updated target service packet includes connectivity fault management information, the connectivity fault management information includes an Ether type field, a connectivity fault management header field, a first ingress interface information field and/or a first egress interface information field, the second ingress interface information field and/or the second egress interface information field, and an end field, and the connectivity fault management information is located at a tail of an Ethernet packet of the service packet.

Figure 11:
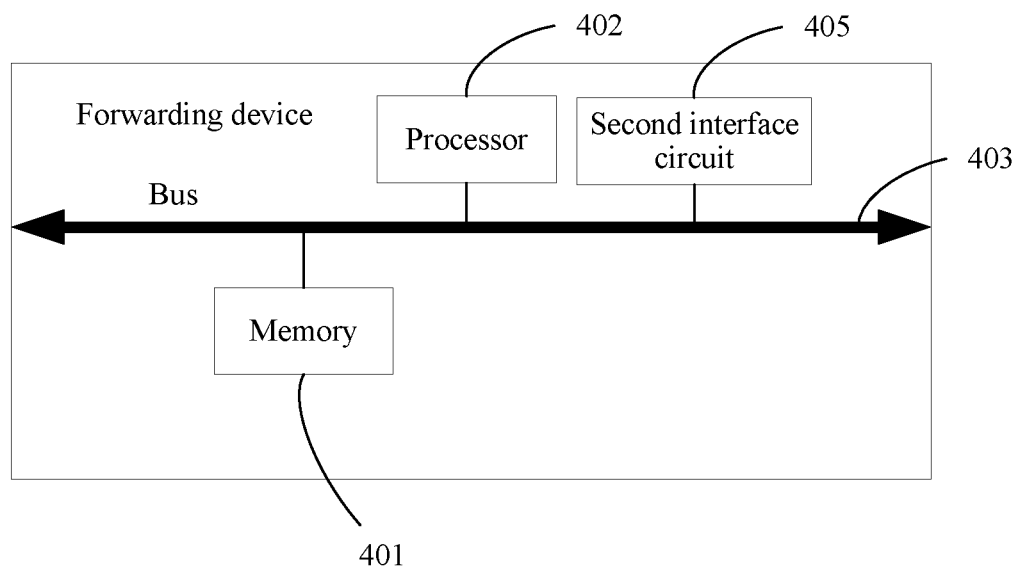
FIG. 11 is a schematic structural diagram of a still further forwarding device according to an embodiment of this application.

As shown in FIG. 11, the forwarding device 40 further includes:

a second interface circuit 405, configured to forward the another updated target service packet.

When the forwarding device is an egress device, the processor 402 is specifically configured to:

parse and extract the service packet according to a path detection untag on the ingress interface and/or the egress interface through which the service packet passes, to obtain connectivity fault management information and a packet characteristic field, where the connectivity fault management information includes an Ether type field, a connectivity fault management header field, one or more ingress interface information fields and/or one or more egress interface information fields, and an end field, the one or more ingress interface information fields and/or the one or more egress interface information fields form path information, the path information is used to indicate a forwarding path of the service packet in a forwarding path detection enabling network, and the service packet includes the connectivity fault management information and the packet characteristic field.

The processor 402 is further configured to: when the service packet is a dummy packet, discard the service packet.

Figure 12:
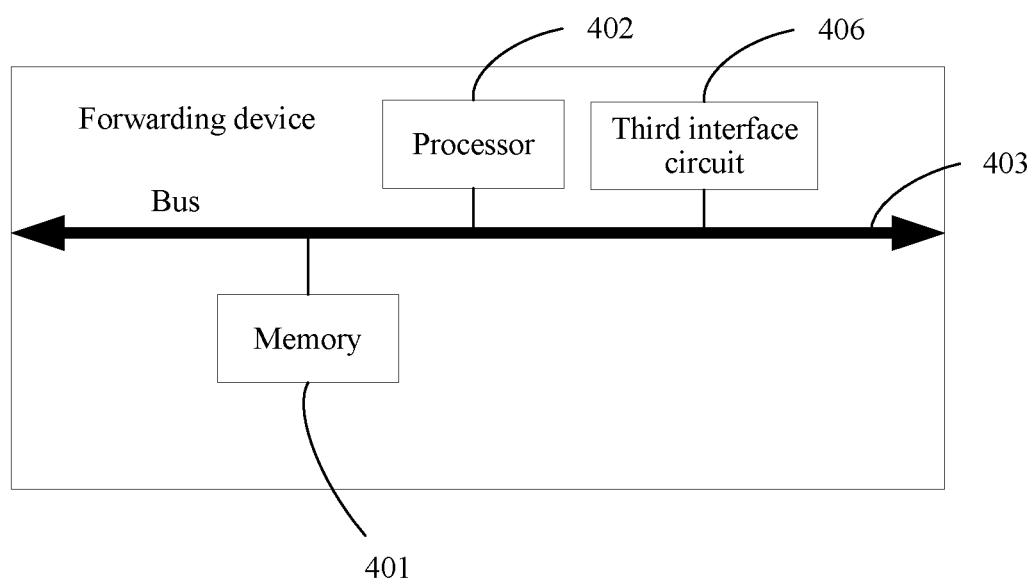
FIG. 12 is a schematic structural diagram of a yet further forwarding device according to an embodiment of this application.

As shown in FIG. 12, the forwarding device 40 further includes:

a third interface circuit 406, configured to: when the service packet is a normal packet, strip the connectivity fault management information, and continue to forward the service packet.

The processor 402 is further configured to:

generate and save a forwarding path information table of the flow rule according to the packet characteristic field and the path information, so that the forwarding path information table is queried by a network management device or is sent to a network controller.

The processor 402 is further configured to:

preconfigured at least one of the path detection tag, the path detection untag, or the flow rule, where the path detection tag is used to instruct the forwarding device to configure the ingress interface information or the egress interface information of the forwarding device, and the path detection untag is used to instruct the forwarding device to parse and extract connectivity fault management information and a packet characteristic field of an updated target service packet.

It should be noted that the processor 402 herein may be one processor or may be a collective term of multiple processing elements.

For example, the processor may be a central processing unit (CPU), or may be an application-specific integrated circuit (ASIC), or one or more integrated circuits that are configured to implement this embodiment of this application, such as one or more microprocessors (e.g., digital signal processor) or one or more field programmable gate arrays (FPGA).

The memory 401 may be a storage apparatus, or may be a collective term of multiple storage elements, and is configured to store executable program code and the like. In addition, the memory 401 may include a random access memory (RAM), or may include a non-volatile memory (non-volatile memory), such as a magnetic disk storage, a flash (Flash), and the like.

The bus 403 may be an industry standard architecture (ISA) bus, a peripheral component interconnect (PCI) bus, an extended industry standard architecture (EISA) bus, or the like. The bus 404 may be categorized into an address bus, a data bus, a control bus, and the like. For ease of illustration, only one bold line is used in FIG. 9 to represent the bus, which, however, does not mean there is only one bus or only one type of bus.

The interface circuit may be an interface circuit for implementing a wired connection.

Optionally, the forwarding device 30 may be a router or a switch.

Optionally, the forwarding device 40 may perform the method embodiment corresponding to FIG. 1 or FIG. 2A and FIG. 2B.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in form of hardware, or may be implemented in a form of hardware in addition to a software functional unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for obtaining path information for use with a forwarding device, the method comprising:
    obtaining a target service packet, wherein the target service packet is a service packet that matches a flow rule preconfigured on the forwarding device; and
    generating ingress interface information and/or egress interface information according to a path detection tag on an ingress interface and/or an egress interface through which the target service packet passes;
    wherein when the forwarding device is an intermediate device, the service packet is an updated target service packet, the target service packet comprises the path detection tag on the ingress interface and/or the egress interface through which the target service packet passes; and
    generating an ingress interface information and/or an egress interface information according to a path detection tag on an ingress interface and/or an egress interface through which the target service packet passes comprises:
    generating a second ingress interface information field and/or a second egress interface information field according to a path detection tag on an ingress interface and/or an egress interface through which the updated target service packet passes, to obtain another updated target service packet, wherein the other updated target service packet comprises connectivity fault management information comprising an Ether type field, a connectivity fault management header field, a first ingress interface information field and/or a first egress interface information field, the second ingress interface information field and/or the second egress interface information field, and an end field, and wherein the connectivity fault management information is located at a tail of an Ethernet packet of the other updated target service packet, and
    forwarding the other updated target service packet.

2. The method according to claim 1, wherein the flow rule is characteristic matching information of a specific service packet.

3. The method according to claim 1, wherein:
    the target service packet comprises connectivity fault management information, and the connectivity fault management information comprises an Ether type field, a connectivity fault management header field, a first ingress interface information field and/or a first egress interface information field, and an end field.

4. The method according to claim 3, wherein the connectivity fault management information of the target service packet is located at a tail of an Ethernet packet of the target service packet.

5. The method according to claim 3, further comprising: after obtaining the target service packet,
    generating a dummy packet of the target service packet according to a detection policy, wherein the dummy packet comprises the connectivity fault management information of the target service packet, the detection policy including a determination whether a length of the target service packet is greater than a preset threshold.

6. The method according to claim 5, wherein generating the dummy packet of the target service packet according to the detection policy comprises:

directly generating the dummy packet of the target service packet according to an instruction of the detection policy, or determining whether the length of the target service packet is greater than the preset threshold;

when the length of the target service packet is greater than the preset threshold, generating the dummy packet of the target service packet according to the target service packet, and generating the first ingress interface information and/or the first egress interface information and the connectivity fault management information of the target service packet according to the path detection tag on the ingress interface and/or the egress interface through which the dummy packet of the target service packet passes;

when the length of the target service packet is less than the preset threshold, generating a first ingress interface information field and/or a first egress interface information field and the connectivity fault management information of the target service packet according to the path detection tag on the ingress interface and/or the egress interface through which the target service packet passes; and wherein the dummy packet further comprises a header having a preset quantity of bytes of the target service packet, and a packet mark for identifying the dummy packet is set at a preset location of the dummy packet.

7. The method according to claim 1, wherein when the forwarding device is an egress device, and further comprising after obtaining the target service packet, parsing and extracting the target service packet according to a path detection untag on the ingress interface and/or the egress interface through which the target service packet passes, to obtain connectivity fault management information of the target service packet and a packet characteristic field of the target service packet, wherein the connectivity fault management information of the target service packet comprises an Ether type field, a connectivity fault management header field, one or more ingress interface information fields and/or one or more egress interface information fields, and an end field, wherein the one or more ingress interface information fields and/or the one or more egress interface information fields form path information for indicating a forwarding path of the target service packet in a forwarding path detection enabling network.

8. The method according to claim 7, further comprising: after parsing and extracting the target service packet according to the path detection untag on the ingress interface and/or the egress interface through which the target service packet passes, when the target service packet is a dummy packet, discarding the target service packet;

when the target service packet is a normal packet, stripping the connectivity fault management information of the target service packet, and continuing to forward the target service packet; and generating and saving a forwarding path information table of the flow rule according to the packet characteristic field and the path information, so that the forwarding path information table is queried by a network management device or is sent to a network controller.

9. The method according to claim 1, further comprising: before obtaining a target service packet, preconfiguring at least one of the path detection tag, the path detection untag, or the flow rule, wherein the path detection tag is used to instruct the forwarding device to configure the ingress interface information or the egress interface information of the forwarding device, and the path detection untag for instructing the forwarding device to parse and extract connectivity fault management information and a packet characteristic field of the updated target service packet.

10. A forwarding device, comprising:

a non-transitory memory configured to store program code;

a processor configured to invoke the program code stored in the non-transitory memory, and when executed, causes the forwarding device to:

obtain a target service packet, wherein the target service packet is a service packet that matches a flow rule for obtaining the service packet that matches the flow rule, generate an ingress interface information field and/or an egress interface information field according to a path detection tag on an ingress interface and/or an egress interface through which the target service packet passes, and forward an updated target service packet that is the target service packet with the ingress interface information and/or egress interface information, when the forwarding device is an intermediate device, the target service packet is the updated target service packet, and the program code, when executed, causes the forwarding device to:

generate a second ingress interface information field and/or a second egress interface information field according to a path detection tag on an ingress interface and/or an egress interface through which the updated target service packet passes, to obtain another updated target service packet, wherein the other updated target service packet comprises connectivity fault management information comprising an Ether type field, a connectivity fault management header field, a first ingress interface information field and/or a first egress interface information field, the second ingress interface information field and/or the second egress interface information field, and an end field, and wherein the connectivity fault management information is located at a tail of an Ethernet packet of the target service packet; and forward the other updated target service packet.

11. The forwarding device according to claim 10, wherein the program code, when executed, causes the forwarding device to:

determine that a packet characteristic field of the target service packet matches the flow rule, wherein the target service packet comprises the packet characteristic field.

12. The forwarding device according to claim 11, wherein:

the program code, when executed, causes the forwarding device to:

generate a first ingress interface information field and/or a first egress interface information field and connectivity fault management information of the target service packet according to the path detection tag on the ingress interface and/or the egress interface through which the target service packet passes, wherein the connectivity fault management information of the target service packet comprises an Ether type field, a connectivity fault management header field, the first ingress interface information field and/or the first egress interface information field, and an end field, and wherein the connectivity fault management information of the target service packet is located at a tail of an Ethernet packet of the target service packet.

13. The forwarding device according to claim 10, wherein the program code, when executed, causes the forwarding device to:
generate a dummy packet of the target service packet according to a detection policy, wherein the dummy packet comprises the connectivity fault management information of the target service packet.

14. The forwarding device according to claim 13, wherein the program code, when executed, causes the forwarding device to:
directly generate the dummy packet of the target service packet according to an instruction of the detection policy, or determine whether a length of the target service packet is greater than a preset threshold;
when the length of the target service packet is greater than the preset threshold, generate the dummy packet of the target service packet according to the target service packet, and generate the first ingress interface information field and/or the first egress interface information field and the connectivity fault management information of the target service packet according to the path detection tag on the ingress interface and/or the egress interface through which the dummy packet of the target service packet passes;
when the length of the target service packet is less than the preset threshold, generate the first ingress interface information field and/or the first egress interface information field and the connectivity fault management information of the target service packet according to the path detection tag on the ingress interface and/or the egress interface through which the target service packet passes; and
wherein the dummy packet further comprises a header having a preset quantity of bytes of the target service packet, and a packet mark for identifying the dummy packet is set at a preset location of the dummy packet.

15. The forwarding device according to claim 10, wherein when the forwarding device is an egress device, the program code, when executed, causes the forwarding device to:
parse and extract the target service packet according to a path detection untag on the ingress interface and/or the egress interface through which the target service packet passes, to obtain connectivity fault management information of the target service packet and a packet characteristic field of the target service packet, wherein the connectivity fault management information of the target service packet comprises an Ether type field, a connectivity fault management header field, one or more ingress interface information fields and/or one or more egress interface information fields, and an end field, wherein the one or more ingress interface information fields and/or the one or more egress interface information fields form path information, the path information for indicating a forwarding path of the target service packet in a forwarding path detection enabling network.

16. The forwarding device according to claim 15, wherein the program code, when executed, causes the forwarding device to:
when the target service packet is a dummy packet, discard the target service packet,
when the target service packet is a normal packet, strip the connectivity fault management information of the target service packet, and continue to forward the target service packet, and
generate and save a forwarding path information table of the flow rule according to the packet characteristic field and the path information, so that the forwarding path information table is queried by a network management device or is sent to a network controller.

17. The forwarding device according to claim 10, wherein the program code, when executed, causes the forwarding device to:
preconfigure at least one of the path detection tag, the path detection untag, or the flow rule, the path detection tag for instructing the forwarding device to configure the ingress interface information or the egress interface information of the forwarding device, and the path detection untag for instructing the forwarding device to parse and extract connectivity fault management information and a packet characteristic field of the updated target service packet.

* * * * *